US011370453B2

(12) United States Patent
Hiramatsu et al.

(10) Patent No.: US 11,370,453 B2
(45) Date of Patent: Jun. 28, 2022

(54) DRIVING ASSISTANCE METHOD AND DRIVING ASSISTANCE DEVICE

(71) Applicants: Nissan Motor Co., Ltd., Yokohama (JP); Renault S.A.S., Boulogne-Billancourt (FR)

(72) Inventors: Machiko Hiramatsu, Kanagawa (JP); Motonobu Aoki, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 0 days.

(21) Appl. No.: 17/417,809

(22) PCT Filed: Dec. 28, 2018

(86) PCT No.: PCT/IB2018/001592
§ 371 (c)(1),
(2) Date: Jun. 24, 2021

(87) PCT Pub. No.: WO2020/136385
PCT Pub. Date: Jul. 2, 2020

(65) Prior Publication Data
US 2022/0089185 A1 Mar. 24, 2022

(51) Int. Cl.
*B60W 60/00* (2020.01)
*B60W 30/095* (2012.01)
*B60W 40/04* (2006.01)

(52) U.S. Cl.
CPC .... *B60W 60/0015* (2020.02); *B60W 30/0956* (2013.01); *B60W 40/04* (2013.01);
(Continued)

(58) Field of Classification Search
CPC ......... B60W 60/0015; B60W 30/0956; B60W 40/04; B60W 2554/20; B60W 2554/4041; B60W 2554/80; B60W 2555/60
(Continued)

(56) References Cited

U.S. PATENT DOCUMENTS 7,979,172 B2 * 7/2011 Breed ................... G08G 1/161
701/23
2008/0161986 A1 * 7/2008 Breed ................... G01S 19/43
701/23
(Continued)

FOREIGN PATENT DOCUMENTS

DE 102018107341 A1 * 10/2018 ............. B60K 35/00
DE 102018107502 A1 * 10/2018 ............. B60K 35/00
(Continued)

*Primary Examiner* — Atul Trivedi
(74) *Attorney, Agent, or Firm* — Young Basile Hanlon & MacFarlane, P.C.

(57) ABSTRACT

A controller performs: trajectory generation processing of generating a target travel trajectory in such a way that, when a distance between a turning position of an own vehicle and a parked vehicle satisfies a predetermined condition, the own vehicle passes beside the parked vehicle at a predetermined side position with a predetermined interval interposed between the parked vehicle and the own vehicle on one side of the parked vehicle and a turning end position in a case of turning at a position before a position of the parked vehicle or a turning start position in a case of turning after having passed beside the parked vehicle on the route coincides with the predetermined side position in a width direction of a road on which the parked vehicle is parked; and processing of performing travel control, based on the target travel trajectory.

10 Claims, 14 Drawing Sheets

(52) U.S. Cl.
CPC . *B60W 2554/20* (2020.02); *B60W 2554/4041* (2020.02); *B60W 2554/80* (2020.02); *B60W 2555/60* (2020.02)

(58) Field of Classification Search
USPC .......................................................... 701/23
See application file for complete search history.

(56) References Cited

U.S. PATENT DOCUMENTS

| | | | |
|---|---|---|---|
| 2013/0120578 A1* | 5/2013 | Iga | H04N 7/18 |
| | | | 348/148 |
| 2015/0153735 A1* | 6/2015 | Clarke | B62D 15/025 |
| | | | 701/301 |
| 2017/0032681 A1* | 2/2017 | Tomozawa | B62D 15/0285 |
| 2017/0259850 A1* | 9/2017 | Yamashita | B62D 15/028 |
| 2018/0120859 A1* | 5/2018 | Eagelberg | B60W 30/18163 |
| 2019/0369616 A1* | 12/2019 | Ostafew | G01C 21/362 |
| 2020/0139967 A1* | 5/2020 | Beller | G05D 1/0223 |
| 2020/0307563 A1* | 10/2020 | Ghafarianzadeh | |
| | | | B60W 30/0956 |
| 2021/0107566 A1* | 4/2021 | Seegmiller | G08G 1/164 |
| 2021/0286365 A1* | 9/2021 | Jiao | G05D 1/0088 |

FOREIGN PATENT DOCUMENTS

| | | | | |
|---|---|---|---|---|
| DE | 102018107508 A1 * | 10/2018 | | B60K 37/02 |
| DE | 102018127077 A1 * | 4/2020 | | |
| EP | 2620330 A1 * | 7/2013 | | B60R 1/00 |
| EP | 3132997 A2 * | 2/2017 | | B62D 15/027 |
| EP | 3181420 A1 | 6/2017 | | |
| EP | 3244381 A1 | 11/2017 | | |
| JP | 2011-145756 A | 7/2011 | | |
| JP | 2013-109705 A | 6/2013 | | |
| JP | 2013-186723 A | 9/2013 | | |
| JP | 2017-045130 A | 3/2017 | | |
| JP | 2018-146461 A | 9/2018 | | |
| JP | 2018-202876 A | 12/2018 | | |
| WO | WO-2016158236 A1 * | 10/2016 | | B60W 30/06 |
| WO | WO-2018168329 A1 * | 9/2018 | | B60K 31/00 |
| WO | WO-2018168330 A1 * | 9/2018 | | B60W 30/10 |
| WO | WO-2018186252 A1 * | 10/2018 | | B60R 99/00 |
| WO | WO-2018186407 A1 * | 10/2018 | | B60R 99/00 |

* cited by examiner

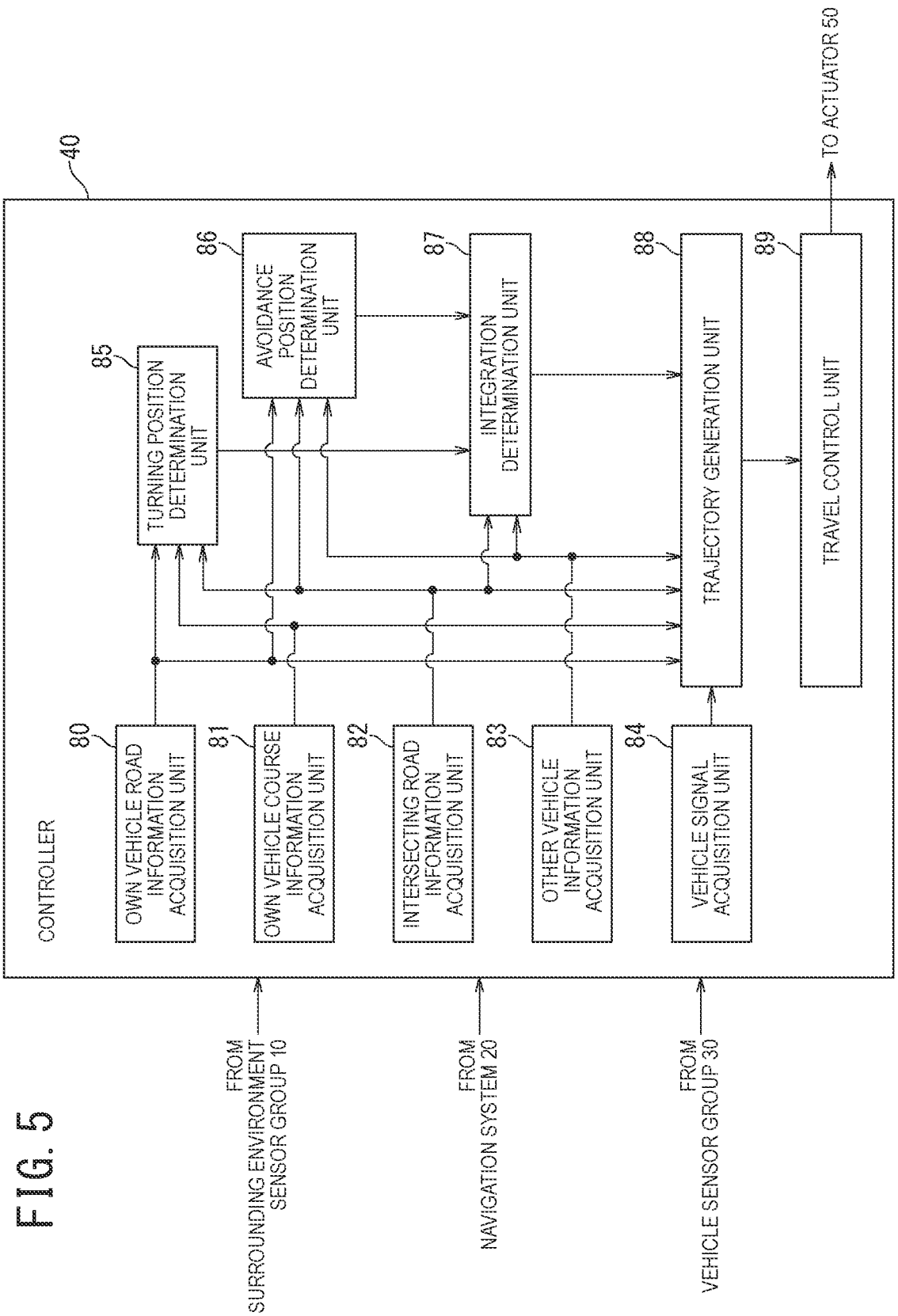

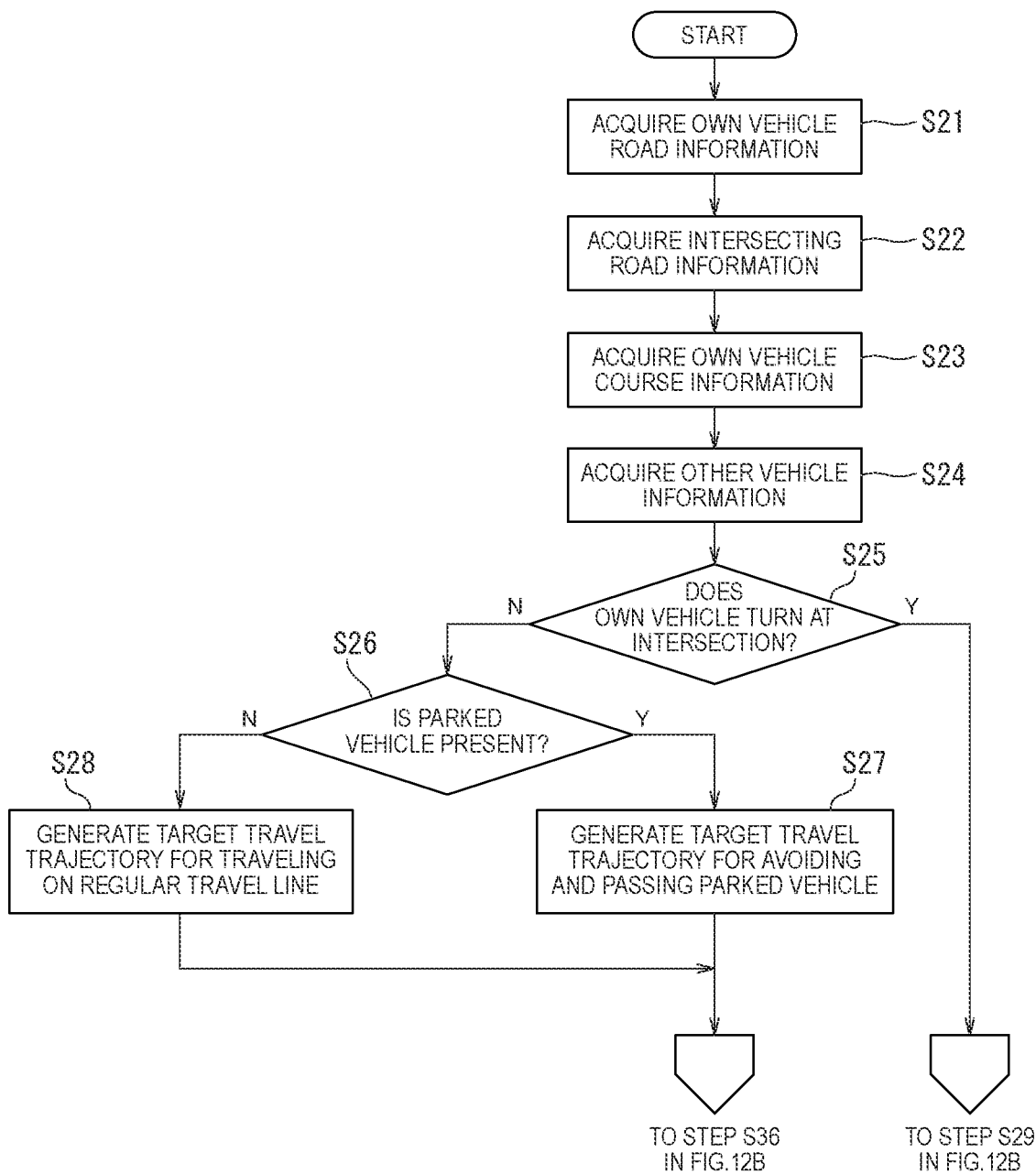

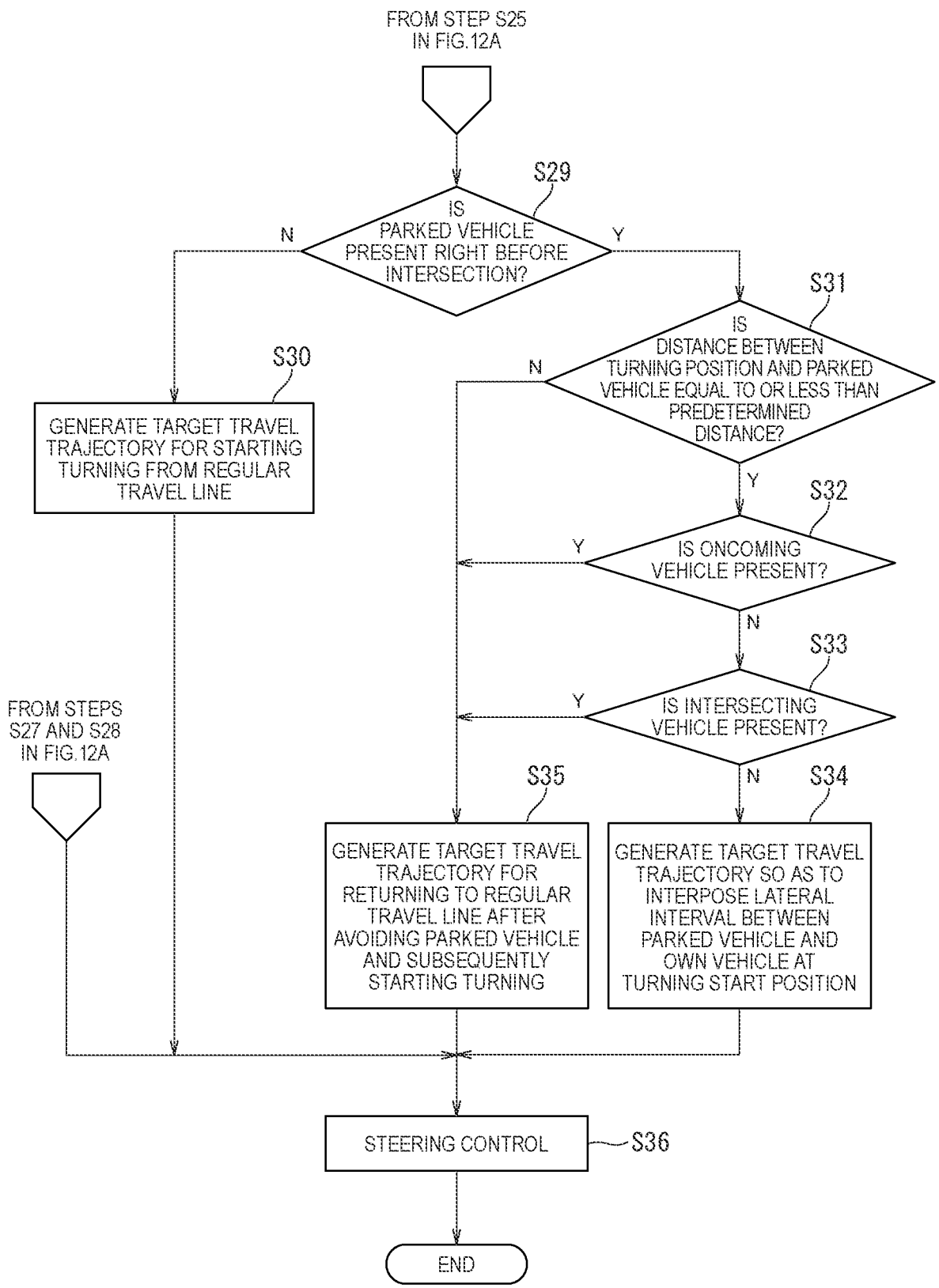

DRIVING ASSISTANCE METHOD AND DRIVING ASSISTANCE DEVICE

TECHNICAL FIELD

The present invention relates to a driving assistance method and a driving assistance device.

BACKGROUND

As a technology to assist driving in avoiding and passing a parked vehicle, a driving assistance device described in JP 2013-109705 A has been known.

The driving assistance device described in JP 2013-109705 A sets a target travel state (passing velocity and lateral interval) in a case where an own vehicle passes beside a parked vehicle or the like by use of a map generated from driving actions taken by skilled drivers and performs driving assistance in such a way that the own vehicle passes beside the parked vehicle or the like while being in the target travel state.

SUMMARY

There are some cases where, when, in driving assistance to perform turning (for example, turning to the right or left at an intersection or an entrance to a facility) in front of or back of a parked vehicle, steering control for turning and steering control for avoidance of the parked vehicle are performed separately, steering becomes frequent and the parked vehicle cannot be avoided smoothly.

An object of the present invention is to make a vehicle avoid and pass a parked vehicle smoothly in driving assistance to perform turning in front of or back of the parked vehicle.

According to one aspect of the present invention, there is provided a driving assistance method including causing a controller to perform: processing of determining presence or absence of a parked vehicle ahead on a route of an own vehicle; processing of determining whether or not turning of the own vehicle is to be performed; processing of determining whether or not distance between a turning position at which the turning is performed and the parked vehicle satisfies a predetermined condition; trajectory generation processing of generating a target travel trajectory in such a way that, when the distance between the turning position and the parked vehicle satisfies the predetermined condition, the own vehicle passes beside the parked vehicle at a predetermined side position with a predetermined interval interposed between the parked vehicle and the own vehicle on one side of the parked vehicle and a turning end position in a case of turning at a position before a position of the parked vehicle or a turning start position in a case of turning after having passed beside the parked vehicle on the route coincides with the predetermined side position in a width direction of a road on which the parked vehicle is parked; and processing of performing travel control, based on the target travel trajectory.

According to the aspect of the present invention, it is possible to make a vehicle avoid and pass a parked vehicle smoothly in driving assistance to perform turning in front of or back of the parked vehicle.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF THE DRAWINGS

FIG. 5 is a block diagram illustrative of an example of a functional configuration of a controller in FIG. 1;

FIG. 12A is a flowchart (part 1) of a second example of the driving assistance method of the embodiment; and FIG. 12B is a flowchart (part 2) of the second example of the driving assistance method of the embodiment.

DETAILED DESCRIPTION

An embodiment of the present invention will now be described with reference to the drawings.

(Configuration)

Figure 1:
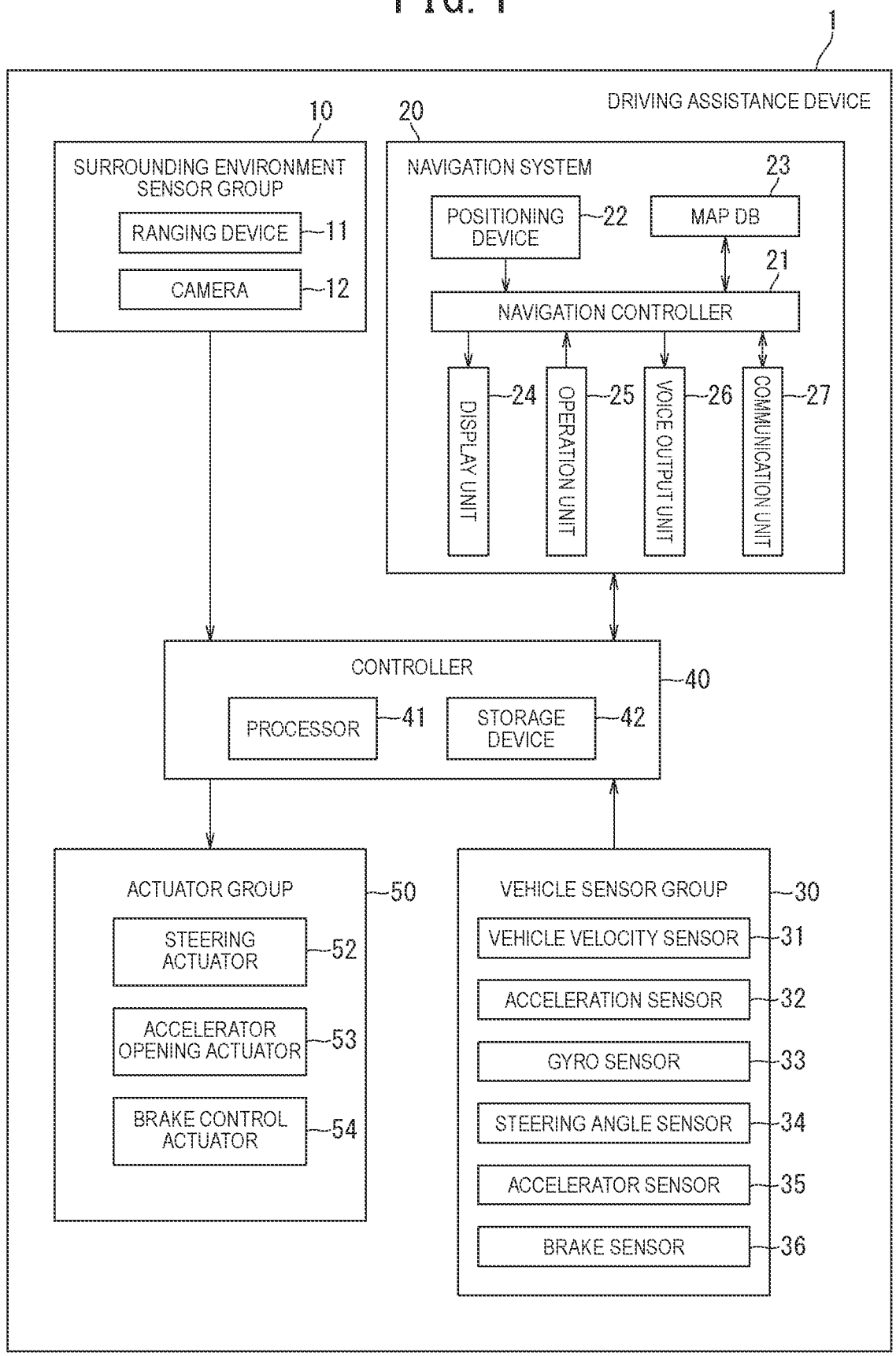
FIG. 1 is a diagram illustrative of a schematic configuration example of a driving assistance device of an embodiment.

FIG. 1 is now referred to. A driving assistance device 1 performs self-driving control for making a vehicle (hereinafter, referred to as "own vehicle") on which the driving assistance device 1 is mounted self-drive without involvement of a driver and driving assistance control for assisting a driver in driving the own vehicle, based on a travel environment around the own vehicle.

The driving assistance control includes travel control, such as self-steering, self-braking, constant velocity travel control, lane keeping control, and merging assistance control.

The driving assistance device 1 includes a surrounding environment sensor group 10, a navigation system 20, a vehicle sensor group 30, a controller 40, and an actuator group 50.

The surrounding environment sensor group 10 is a sensor group that detects a surrounding environment around the own vehicle, such as an object in the surroundings around the own vehicle. The surrounding environment sensor group 10 may include a ranging device 11 and a camera 12. The ranging device 11 and the camera 12 detect the surrounding environment around the own vehicle, such as an object present in the surroundings around the own vehicle, relative positions between the own vehicle and the object, and distance between the own vehicle and the object.

The ranging device 11 may be, for example, a laser range-finder (LRF) or a radar.

The camera 12 may be, for example, a stereo camera. The camera 12 may be composed of monocular cameras, and, by the monocular cameras capturing images of an identical object from a plurality of perspectives, a distance to the object may be calculated. The distance to the object may be calculated based on a ground contact position of the object detected from captured images captured by the monocular cameras.

The ranging device 11 and the camera 12 output surrounding environment information, which is detected information on the surrounding environment, to the controller 40.

The navigation system 20 recognizes a current position of the own vehicle and road map information at the current position. The navigation system 20 sets a travel route to a destination that a passenger inputs and performs route guidance for the passenger in accordance with the travel route. The navigation system 20 further outputs information on the set travel route to the controller 40.

When the travel state of the own vehicle is in a self-driving mode, the controller 40 makes the own vehicle self-drive in such a way that the own vehicle travels along the travel route set by the navigation system 20.

The navigation system 20 includes a navigation controller 21, a positioning device 22, a map database 23, a display unit 24, an operation unit 25, a voice output unit 26, and a communication unit 27. Note that a map database is denoted as "map DB" in FIG. 1.

The navigation controller 21 is an electronic control unit that controls information processing operation of the navigation system 20. The navigation controller 21 includes a processor and peripheral components thereof. The processor may be, for example, a central processing unit (CPU) or a micro-processing unit (MPU).

The peripheral components include a storage device and the like. The storage device may include any of a semiconductor storage device, a magnetic storage device, and an optical storage device. The storage device may include registers, a cache memory, and memories that are a read only memory (ROM) and a random access memory (RAM) used as a main storage device.

The positioning device 22 measures a current position of the own vehicle. The positioning device 22 may be, for example, a global positioning system (GPS) receiver. Alternatively, the positioning device 22 may measure a current position of the own vehicle, based on a global navigation satellite system (GNSS) other than a GPS receiver. Still alternatively, the positioning device 22 may be an inertial navigation device.

The map database 23 stores road map data. The road map data include information on road types, road shapes, gradients, the numbers of lanes, legal velocities (velocity limits), road widths, presence or absence of a junction, and the like. In the road types, for example, an ordinary road and an expressway are included.

The display unit 24 outputs various visual information on the navigation system 20. For example, a map screen showing a map around the own vehicle and a guide of a recommended route may be displayed on the display unit 24. A message generated in the driving assistance control performed by the driving assistance device 1 (for example, a message prompting the driver to perform a steering operation or a deceleration operation) may also be displayed on the display unit 24.

The operation unit 25 accepts operations performed by a passenger, in the navigation system 20. The operation unit 25 may be, for example, a button, a dial, or a slider or may be a touch panel disposed in the display unit 24. For example, the operation unit 25 may accept an input operation of a destination input by the passenger or a switching operation of display screens on the display unit 24.

The voice output unit 26 outputs various voice information in the navigation system 20. The voice output unit 26 may output a driving guide based on a set travel route or a road guide information based on road map data around the own vehicle. The voice output unit 26 may output a message generated in the driving assistance control performed by the driving assistance device 1 (for example, a message prompting the driver to perform a steering operation or a deceleration operation).

The communication unit 27 performs wireless communication with a communication device external to the own vehicle. A communication method used by the communication unit 27 may be, for example, wireless communication through a public mobile telephone network, vehicle-to-vehicle communication, road-to-vehicle communication, or satellite communication. The navigation system 20 may acquire the road map data from an external device through the communication unit 27.

The vehicle sensor group 30 includes a sensor for detecting a travel state of the own vehicle and a sensor for detecting a driving operation performed by the driver.

The sensors for detecting a travel state of the own vehicle include a vehicle velocity sensor 31, an acceleration sensor 32, and a gyro sensor 33.

The sensors for detecting a driving operation include a steering angle sensor 34, an accelerator sensor 35, and a brake sensor 36.

The vehicle velocity sensor 31 detects wheel velocity of the own vehicle and calculates a velocity of the own vehicle, based on the wheel velocity.

The acceleration sensor 32 detects acceleration in the longitudinal direction, acceleration in the vehicle width direction, and acceleration in the up-and-down direction of the own vehicle.

The gyro sensor 33 detects angular velocities of rotation angles of the own vehicle about three axes including a roll axis, a pitch axis, and a yaw axis.

The steering angle sensor 34 detects a current steering angle that is a current rotation angle (steering operation amount) of a steering wheel, which is a steering operator.

The accelerator sensor 35 detects accelerator opening of the own vehicle. For example, the accelerator sensor 35 detects the amount of pressing-down on an accelerator pedal of the own vehicle as the accelerator opening.

The brake sensor 36 detects a brake operation amount by the driver. For example, the brake sensor 36 detects the amount of pressing-down on a brake pedal of the own vehicle as the brake operation amount.

Pieces of information of the velocity, the acceleration, the angular velocity, the steering angle, the accelerator opening, and the brake operation amount of the own vehicle, which are detected by the respective sensors in the vehicle sensor group 30, are collectively referred to as "sensor information". The vehicle sensor group 30 outputs the sensor information to the controller 40.

The controller 40 is an electronic control unit that performs the driving assistance control of the own vehicle. The controller 40 includes a processor 41 and peripheral components, such as a storage device 42. The processor 41 may be, for example, a CPU or an MPU.

The storage device 42 may include any of a semiconductor storage device, a magnetic storage device, and an optical storage device. The storage device 42 may include registers, a cache memory, and memories, that are a ROM and a RAM used as a main storage device.

Note that the controller 40 may be achieved by a functional logic circuit that is implemented in a general-purpose semiconductor integrated circuit. For example, the controller 40 may include a programmable logic device (PLD), such as a field-programmable gate array (FPGA), and the like.

The controller 40 generates a target travel trajectory on which the own vehicle is made to travel along a travel route set by the navigation system 20, based on the surrounding environment information input from the surrounding environment sensor group 10 and the sensor information input from the vehicle sensor group 30.

The controller 40 makes the own vehicle travel autonomously by driving the actuator group 50 in such a way that the own vehicle travels on the generated target travel trajectory.

The actuator group 50 operates the steering wheel, the accelerator opening, and a braking device of the own vehicle according to a control signal from the controller 40 and thereby generates vehicle behavior of the own vehicle. The actuator group 50 includes a steering actuator 52, an accelerator opening actuator 53, and a brake control actuator 54.

The steering actuator 52 controls steering direction and the amount of steering of the own vehicle.

The accelerator opening actuator 53 controls the accelerator opening of the own vehicle.

The brake control actuator 54 controls braking action of the braking device of the own vehicle.

Next, driving assistance that the driving assistance device 1 performs when the own vehicle is made to turn at an intersection or the like will be described.

Figure 2A:
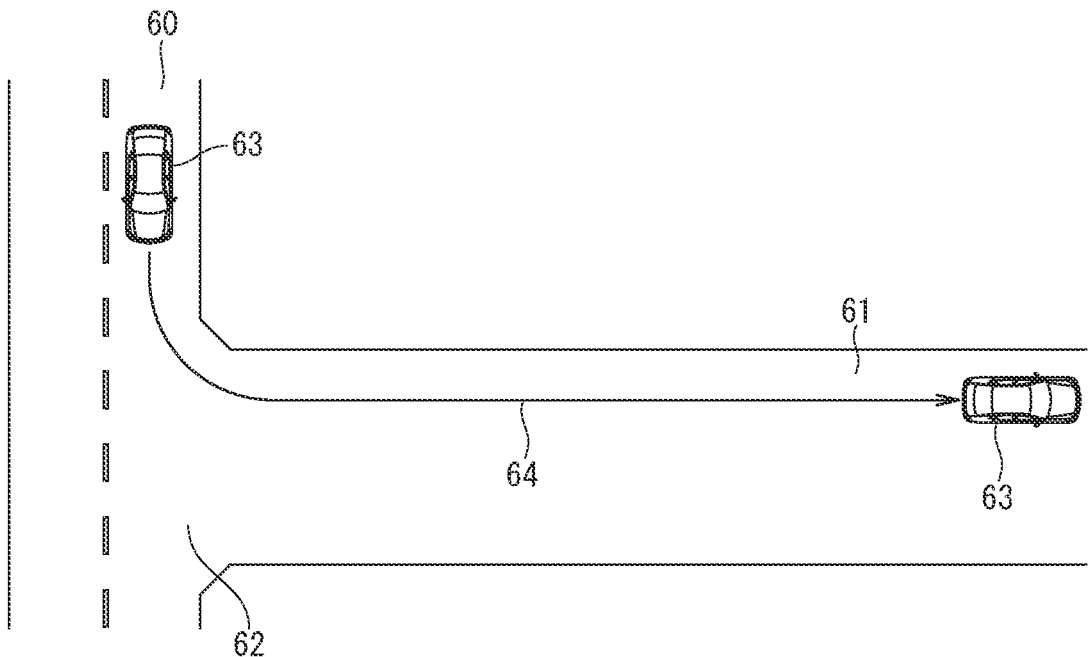
FIG. 2A is a diagram illustrative of an example of driving assistance at the time of turning at an intersection.

FIG. 2A is now referred to. A case is assumed where an own vehicle 63 is made to turn (to the left) at an intersection 62 at which a road 60 and a road 61 intersect each other and to enter the road 61 from the road 60. The road 60 on which the own vehicle 63 travels before turning is referred to as "own vehicle road", and the road 61 that intersects the own vehicle road 60 is referred to as "intersecting road".

In this case, the driving assistance device 1 sets a target travel trajectory on which the own vehicle 63 turns at the intersection 62 and subsequently travels on the intersecting road 61 along a travel line 64.

The travel line 64 is set based on road width and presence or absence of a lane marking of the intersecting road 61, a lateral position and lane width of a lane of the intersecting road 61 on which the own vehicle travels, vehicle width of the own vehicle 63, the number of lanes, a traffic rule applied to the intersecting road 61, and the like when the own vehicle 63 does not avoid an obstacle (for example, a parked vehicle).

For example, when there is a lane marking separating the travel lane and the opposite lane, the driving assistance device 1 may set the travel line 64 at substantially the center of the lane on which the own vehicle travels.

For example, when there is no lane marking separating the travel lane and the opposite lane, the driving assistance device 1 may set the travel line 64 on the left side of the intersecting road 61 in an area where left-hand traffic is mandatory and the right side of the intersecting road 61 in an area where right-hand traffic is mandatory in such a way as to interpose a predetermined interval between the travel line 64 and the road shoulder.

A predetermined travel line 64 on which the own vehicle 63 travels without avoiding an obstacle is referred to as "regular travel line".

Figure 2B:
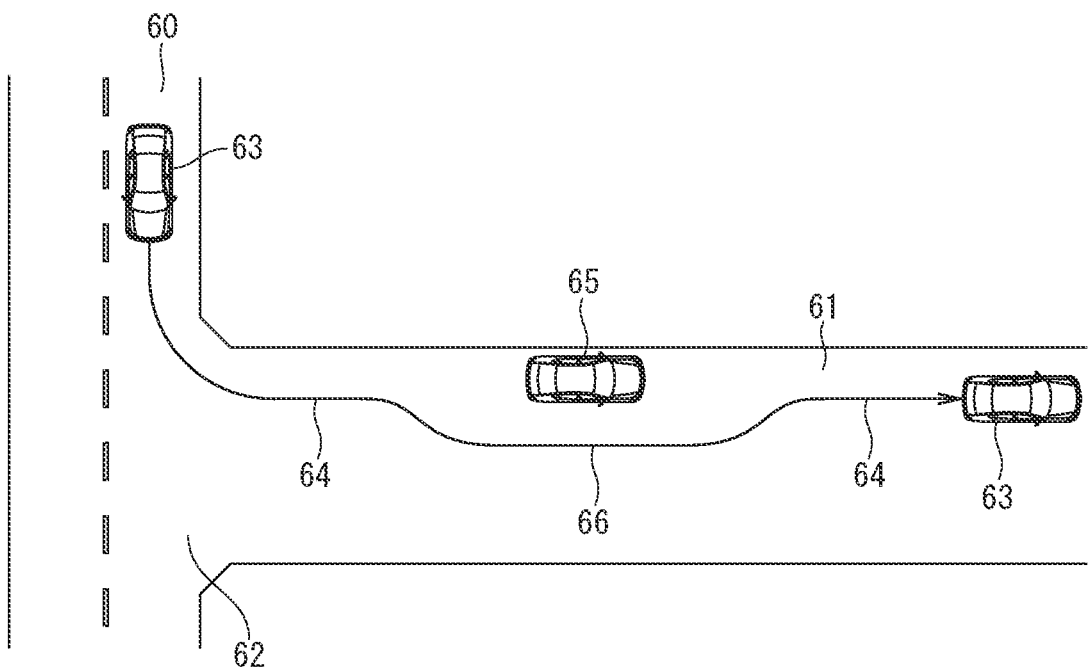
FIG. 2B is a diagram illustrative of an example of driving assistance at the time of, after turning at an intersection, entrance to an intersecting road and subsequent avoidance of and passing beside a parked vehicle.

FIG. 2B illustrates a case where a parked vehicle 65 is present on the intersecting road 61. In this case, it is conceivable that a target travel trajectory is set on which the own vehicle 63 is once made to travel along the regular travel line 64 immediately after having turned at the intersection 62 and entered the intersecting road 61 and subsequently made to avoid and pass beside the parked vehicle 65 as indicated by a travel line 66 and return to the regular travel line 64.

In this case, steering control for turning at the intersection 62 and steering control for avoidance of the parked vehicle 65 are not continuous and are performed separately. That is, the own vehicle 63 travels straight along the regular travel line 64 between steering to turn at the intersection 62 and steering to avoid the parked vehicle 65.

Since this control causes steering control for once returning a steering angle and the steering control for avoidance of the parked vehicle 65 to occur after the steering control for turning at the intersection 62, steering becomes frequent and it is thus not possible to avoid the parked vehicle 65 smoothly.

Thus, the driving assistance device 1 integrates the steering control for turning and the steering control for avoidance of the parked vehicle 65. Specifically, the driving assistance device 1 generates a target travel trajectory in such a way that the own vehicle 63 passes beside the parked vehicle 65 at a predetermined side position with a predetermined interval interposed between the parked vehicle 65 and the own vehicle 63 on one side of the parked vehicle 65 and, in conjunction therewith, a turning end position in the case of turning before reaching the parked vehicle 65 or a turning start position in the case of turning after having passed beside the parked vehicle 65 coincides with the predetermined side position in the width direction of the road on which the parked vehicle is parked.

Hereinafter, integrating the steering control for turning and the steering control for avoidance of the parked vehicle 65 is sometimes simply referred to as "integrating steering control".

Figure 3A:
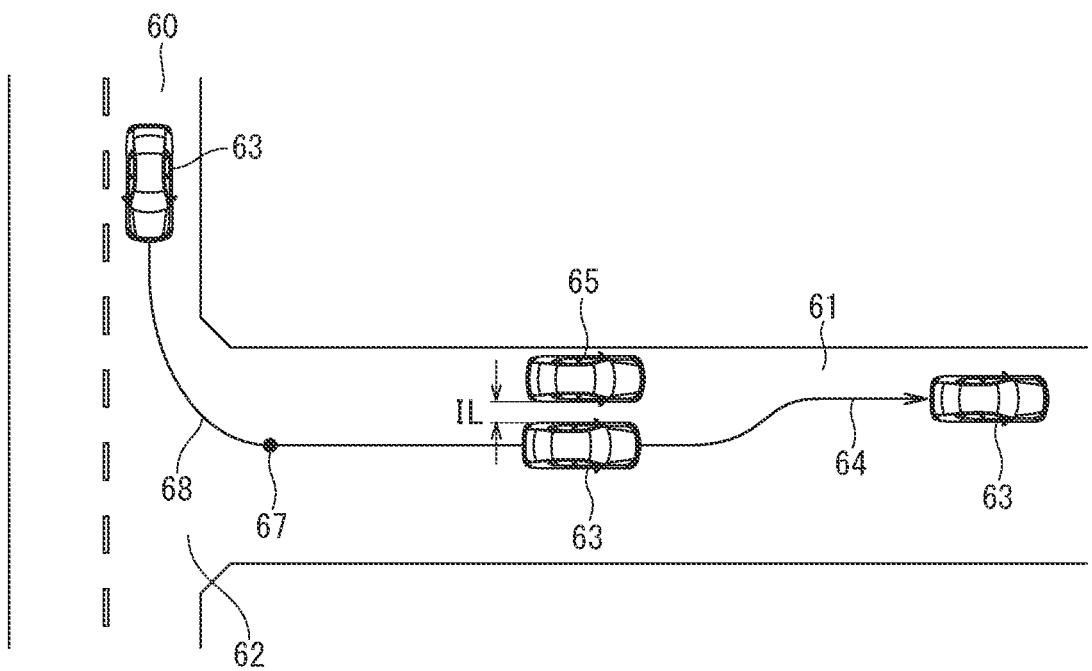
FIG. 3A is a diagram illustrative of an example of driving assistance in which steering control for turning to the left at an intersection and steering control for, after turning to the left, avoidance of and passing beside a parked vehicle are integrated.
Figure 3B:
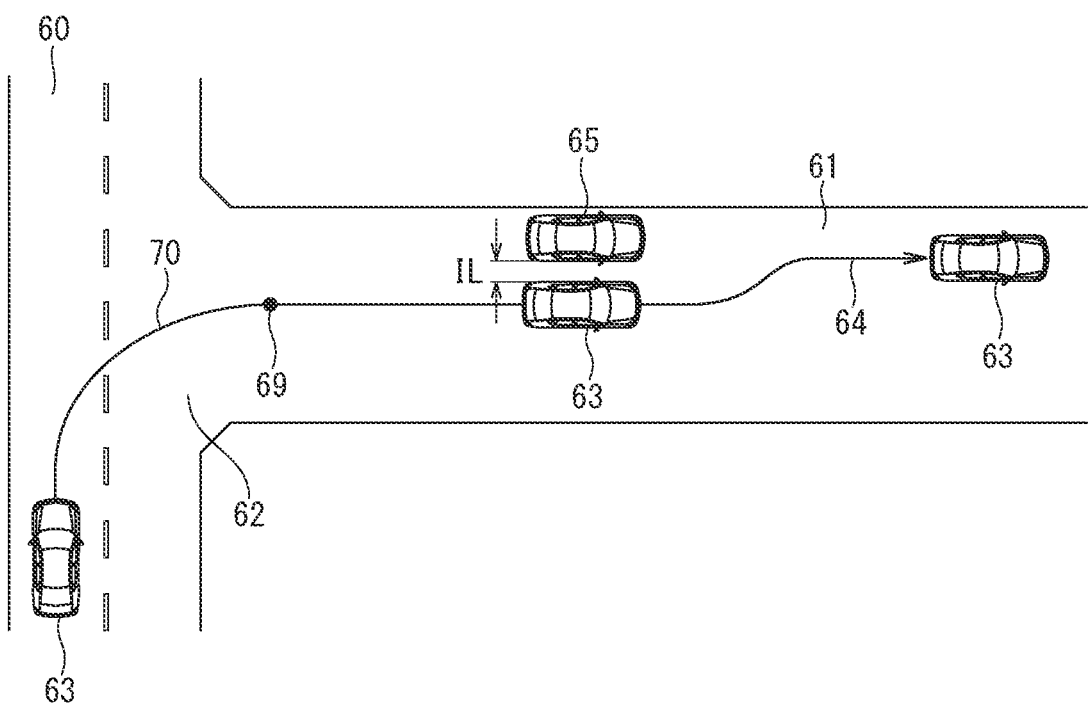
FIG. 3B is a diagram illustrative of an example of driving assistance in which steering control for turning to the right at an intersection and steering control for, after turning to the right, avoidance of and passing beside a parked vehicle are integrated.

With reference to FIGS. 3A and 3B, a case where the parked vehicle 65 is present on a road that the own vehicle 63, after having turned, enters will be described.

As illustrated in FIG. 3A, when the own vehicle 63 turns to the left at the intersection 62 and enters the intersecting road 61 on which the parked vehicle 65 is present, the driving assistance device 1 generates a target travel trajectory 68 on which the own vehicle 63 turns to the left at the intersection 62 in such a way as to interpose a lateral interval IL between the own vehicle 63 and the parked vehicle 65 at an end position (turning end position) 67 of the turning on the intersecting road 61 and passes beside the parked vehicle 65 at a lateral position with the lateral interval IL interposed between the own vehicle 63 and the parked vehicle 65, thereby avoiding the parked vehicle 65. As used herein, an end position of turning may be, for example, a position at which the travel direction of the own vehicle 63 becomes parallel with the intersecting road 61 or a position at which the yaw angle of the vehicle ceases to change.

As illustrated in FIG. 3B, when the own vehicle 63 turns to the right at the intersection 62 and enters the intersecting road 61 on which the parked vehicle 65 is present, the driving assistance device 1 generates a target travel trajectory 70 on which the own vehicle 63 turns to the right at the intersection 62 in such a way as to interpose a lateral interval IL between the own vehicle 63 and the parked vehicle 65 at an end position (turning end position) 69 of the turning on the intersecting road 61 and passes beside the parked vehicle 65 at a lateral position with the lateral interval IL interposed between the own vehicle 63 and the parked vehicle 65, thereby avoiding the parked vehicle 65. That is, when, as illustrated in FIGS. 3A and 3B, the own vehicle 63 turns before reaching the parked vehicle 65, the driving assistance device 1 generates the target travel trajectories 68 and 70 in such a way that the own vehicle 63 passes beside the parked vehicle 65 at a predetermined side position with a predetermined interval IL interposed between the parked vehicle 65 and the own vehicle 63 on one side of the parked vehicle 65 and, in conjunction therewith, the turning end positions 69 and 67 coincide with the predetermined side position in the width direction of the road on which the parked vehicle 65 is parked, respectively.

Next, a case where the own vehicle 63 avoids the parked vehicle 65 and subsequently turns will be described with reference to FIGS. 4A and 4B.

Figure 4A:
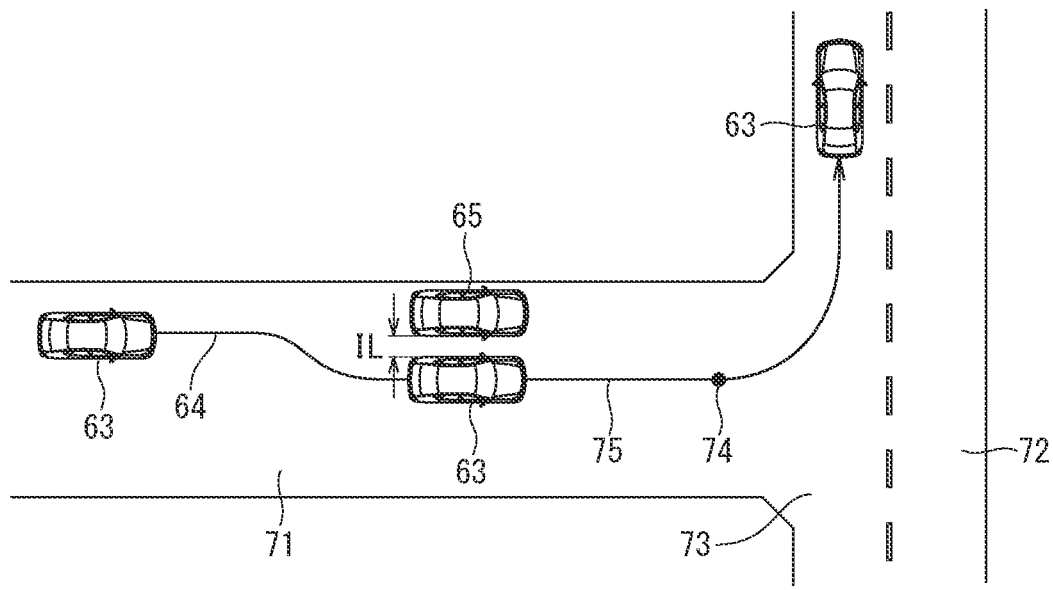
FIG. 4A is a diagram illustrative of an example of driving assistance in which steering control for avoidance of and passing beside a parked vehicle and steering control for, after avoidance of the parked vehicle, turning to the left at an intersection are integrated.

A case is assumed where, as illustrated in FIG. 4A, the own vehicle 63 is made to turn (to the left) at an intersection 73 at which a road 71, on which the parked vehicle 65 is present, and a road 72 intersect each other and to enter the road 72 from the road 71. The road 71 on which the own vehicle 63 travels before turning is referred to as "own vehicle road", and the road 72 that intersects the own vehicle road 71 is referred to as "intersecting road".

The driving assistance device 1 generates a target travel trajectory 75 on which the own vehicle 63 moves in a lateral direction in such a way as to pass beside the parked vehicle 65 at a lateral position with a lateral interval IL interposed between the own vehicle 63 and the parked vehicle 65, thereby avoiding the parked vehicle 65 and subsequently turns to the left at the intersection 73 in such a way as to interpose the lateral interval IL between the own vehicle 63 and the parked vehicle 65 at a start position 74 of turning on the own vehicle road 71. As used herein, a start position of turning may be, for example, a position at which the travel direction of the own vehicle 63 starts to incline with respect to the own vehicle road 71 or a position at which the yaw angle starts to change.

Figure 4B:
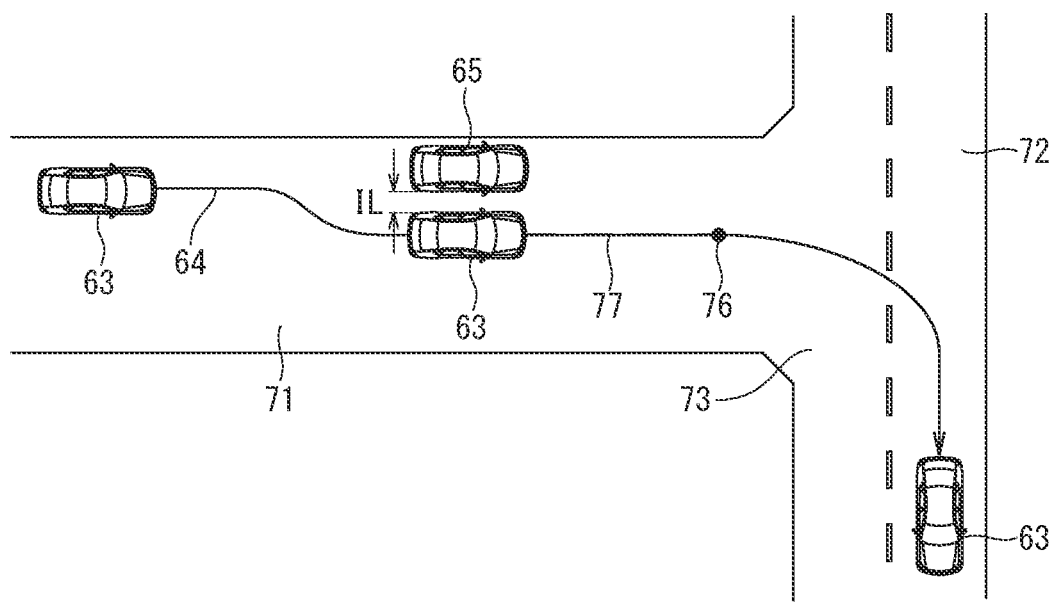
FIG. 4B is a diagram illustrative of an example of driving assistance in which the steering control for avoidance of and passing beside a parked vehicle and steering control for, after avoidance of the parked vehicle, turning to the right at an intersection are integrated.

FIG. 4B illustrates a case where the own vehicle 63 is made to turn to the right and enter the intersecting road 72 from the own vehicle road 71.

The driving assistance device 1 generates a target travel trajectory 77 on which the own vehicle 63 moves in a lateral direction in such a way as to pass beside the parked vehicle 65 at a lateral position with a lateral interval IL interposed between the own vehicle 63 and the parked vehicle 65, thereby avoiding the parked vehicle 65 and subsequently turns to the right at the intersection 73 in such a way as to interpose the lateral interval IL between the own vehicle 63 and the parked vehicle 65 at a start position 76 of turning on the own vehicle road 71. That is, when, as illustrated in FIGS. 4A and 4B, the own vehicle 63 turns after having passed beside the parked vehicle 65, the driving assistance device 1 generates the target travel trajectories 75 and 77 in such a way that the own vehicle 63 passes beside the parked vehicle 65 at a predetermined side position with a predetermined interval IL interposed between the parked vehicle 65 and the own vehicle 63 on one side of the parked vehicle 65 and, in conjunction therewith, the turning start positions 74 and 76 coincide with the predetermined side position in the width direction of the road on which the parked vehicle is parked, respectively.

Integrating steering control as described above enables the number of times of steering to be reduced and the parked vehicle 65 to be avoided smoothly.

Next, an example of a functional configuration of the controller 40 will be described with reference to FIG. 5. The controller 40 includes an own vehicle road information acquisition unit 80, an own vehicle course information acquisition unit 81, an intersecting road information acquisition unit 82, an other vehicle information acquisition unit 83, a vehicle signal acquisition unit 84, a turning position determination unit 85, an avoidance position determination unit 86, an integration determination unit 87, a trajectory generation unit 88, and a travel control unit 89.

Functions of the own vehicle road information acquisition unit 80, the own vehicle course information acquisition unit 81, the intersecting road information acquisition unit 82, the other vehicle information acquisition unit 83, the vehicle signal acquisition unit 84, the turning position determination unit 85, the avoidance position determination unit 86, the integration determination unit 87, the trajectory generation unit 88, and the travel control unit 89 may be achieved by, for example, the processor 41 of the controller 40 executing computer programs stored in the storage device 42.

The own vehicle road information acquisition unit 80 acquires own vehicle road information that is information on the own vehicle roads 60 and 71, from surrounding environment information output from the surrounding environment sensor group 10 and/or road map data read from the map database. The own vehicle road information may be, for example, information representing road widths WO of the own vehicle roads 60 and 71.

The own vehicle road information acquisition unit 80 outputs the own vehicle road information to the turning position determination unit 85, the avoidance position determination unit 86, and the trajectory generation unit 88.

The own vehicle course information acquisition unit 81 acquires own vehicle course information on a planned course of the own vehicle from a travel route set by the navigation system 20. The own vehicle course information may be, for example, information representing whether the own vehicle 63 travels straight, turns to the left, or turns to the right at the intersections 62 and 73.

The own vehicle course information acquisition unit 81 outputs the own vehicle course information to the turning position determination unit 85 and the trajectory generation unit 88.

The intersecting road information acquisition unit 82 acquires intersecting road information that is information on the intersecting roads 61 and 72, from the surrounding environment information output from the surrounding environment sensor group 10 and/or the road map data read from the map database 23. The intersecting road information acquisition unit 82 may acquire the intersecting road information through vehicle-to-vehicle communication or road-to-vehicle communication performed by the communication unit 27.

The intersecting road information may be, for example, information that represents positions (Xin, Yin) and road widths of the intersecting roads 61 and 72 and signal indication of a traffic signal installed at the intersection 73 of the own vehicle road 71 and the intersecting road 72. The positions (Xin, Yin) of the intersecting roads 61 and 72 may be, for example, coordinates in a coordinate system that is used in the road map data of the map database 23 or relative coordinates with a current position of the own vehicle 63 as the origin.

The intersecting road information acquisition unit 82 outputs the intersecting road information to the turning position determination unit 85, the avoidance position determination unit 86, the integration determination unit 87, and the trajectory generation unit 88.

The other vehicle information acquisition unit 83 acquires other vehicle information that is information on another vehicle present around the own vehicle 63, from the surrounding environment information output from the surrounding environment sensor group 10. The other vehicle information acquisition unit 83 may acquire the other vehicle information through vehicle-to-vehicle communication or road-to-vehicle communication performed by the communication unit 27.

The other vehicle may be, for example, the parked vehicle 65, an oncoming vehicle approaching the own vehicle 63 on the own vehicle road 71 or the intersecting road 61 on which the parked vehicle 65 is present, or an intersecting vehicle traveling on the intersecting road 72 and approaching the intersection 73.

The other vehicle information may be information that represents a position (Xpn, Ypn) and vehicle width of the other vehicle. The X-coordinate Xpn in the position of the other vehicle may be, for example, a coordinate in the width direction (lateral direction) of the intersecting road 61 or the own vehicle road 71. The Y-coordinate Ypn in the position of the other vehicle may be, for example, a coordinate in the travel direction (longitudinal direction) with the position of the intersection 62 or 73 as the origin.

The position (Xpn, Ypn) of the other vehicle may be, for example, coordinates in a coordinate system that is used in the road map data of the map database 23 or relative coordinates with a current position of the own vehicle 63 as the origin.

The other vehicle information acquisition unit 83 outputs the other vehicle information to the avoidance position determination unit 86, the integration determination unit 87, and the trajectory generation unit.

The vehicle signal acquisition unit 84 acquires a vehicle signal that is information on the own vehicle 63, from the sensor information output from the vehicle sensor group 30. The vehicle signal may be, for example, a signal representing velocity or information representing a steering angle of the own vehicle 63.

The vehicle signal acquisition unit 84 outputs the vehicle signal to the trajectory generation unit 88.

The turning position determination unit 85 determines a turning position of the own vehicle 63. For example, the turning position determination unit 85 may determine a turning position of the own vehicle 63 (a position at which turning of the own vehicle 63 is performed, that is, a position at which the yaw angle of the own vehicle starts to change), based on the road widths WO of the own vehicle roads 60 and 71, road widths of the intersecting roads 61 and 72, and the positions (Xin, Yin) of the intersecting roads.

Figure 6A:
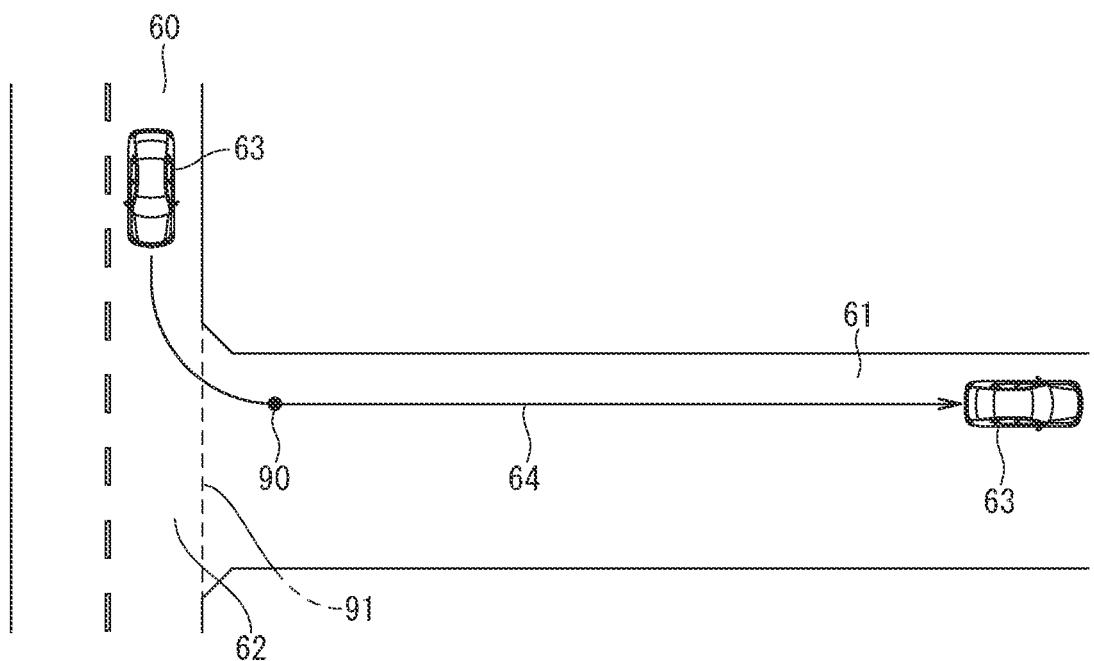
FIG. 6A is a diagram illustrative of a first example of a determination method of a turning position.

FIG. 6A is now referred to. For example, the turning position determination unit 85 may determine an end point 90 of turning at the intersection 62 in a case where the end point 90 of turning is located on the regular travel line 64 (for example, a case where the steering control for turning at the intersection 62 and the steering control for avoidance of a parked vehicle are not integrated) as a turning position.

For example, the turning position determination unit 85 may also determine a position 91 of an entrance of the intersection 62 as a turning position.

Figure 6B:
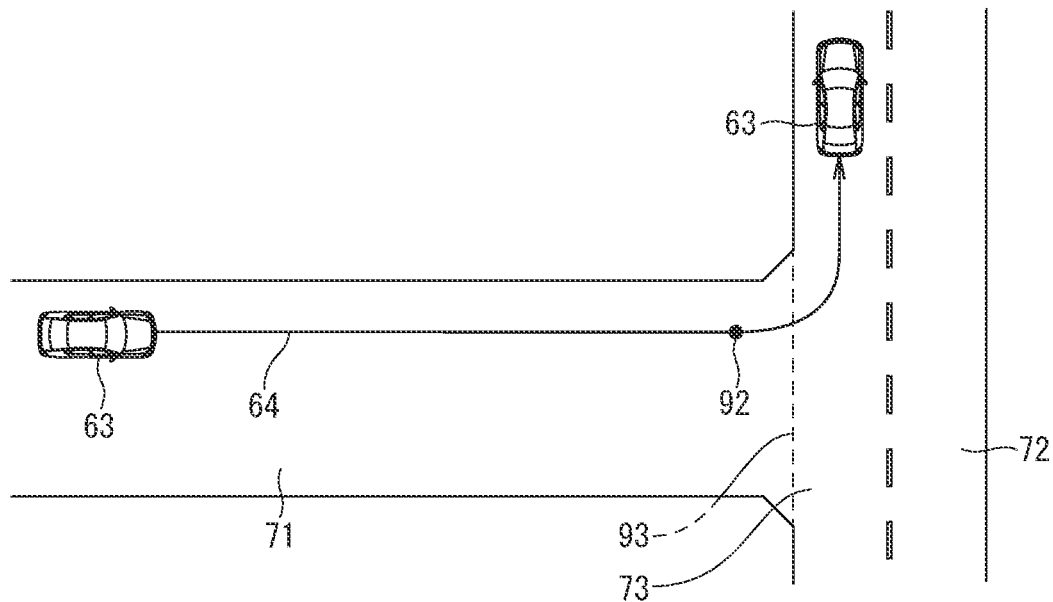
FIG. 6B is a diagram illustrative of a second example of the determination method of a turning position.

FIG. 6B is now referred to. For example, the turning position determination unit 85 may determine a start point 92 of turning at the intersection 73 in a case where the start point 92 of turning is located on the regular travel line 64 (for example, a case where the steering control for turning at the intersection 73 and the steering control for avoidance of a parked vehicle are not integrated) as a turning position.

For example, the turning position determination unit 85 may also determine a position 93 of an entrance of the intersection 73 as a turning position.

Note that the driving assistance device 1 may integrate the steering control for turning at a location other than an intersection and the steering control for avoidance of a parked vehicle. For example, the driving assistance device 1 may integrate the steering control for turning on a curved road and the steering control for avoidance of a parked vehicle.

In addition, the driving assistance device 1 may integrate the steering control for turning in the case of entering or exiting into/from a facility (for example, a parking lot, a commercial facility, or a public facility) existing along a road on which a parked vehicle is present and the steering control for avoidance of the parked vehicle. In this case, the turning position determination unit 85 may determine the position of an entrance or an exit of the facility as a turning position.

The turning position determination unit 85 outputs the determined turning position to the integration determination unit 87.

FIG. 5 is now referred to. The avoidance position determination unit 86 determines an avoidance position at which the own vehicle 63 avoids the parked vehicle 65.

For example, the avoidance position determination unit 86 may determine an avoidance position, based on the road width WO of the own vehicle road 71, the road width of the intersecting road 61, and the position (Xpn, Ypn) and the vehicle width of another vehicle.

For example, when the parked vehicle 65 is present on a road that the own vehicle 63, after having turned, enters (FIGS. 3A and 3B), the avoidance position determination unit 86 may determine the rear end of the parked vehicle 65 as an avoidance position.

For example, when the own vehicle 63 avoids the parked vehicle 65 (passes beside the parked vehicle 65) and subsequently turns (FIGS. 4A and 4B), the avoidance position determination unit 86 may determine the front end of the parked vehicle 65 as an avoidance position.

The avoidance position determination unit 86 outputs the determined avoidance position to the integration determination unit 87.

The integration determination unit 87 determines whether or not to integrate steering control, based on whether or not distance D between the turning position and the avoidance position (that is, distance from the turning position to the parked vehicle 65) satisfies a predetermined condition.

Figure 7A:
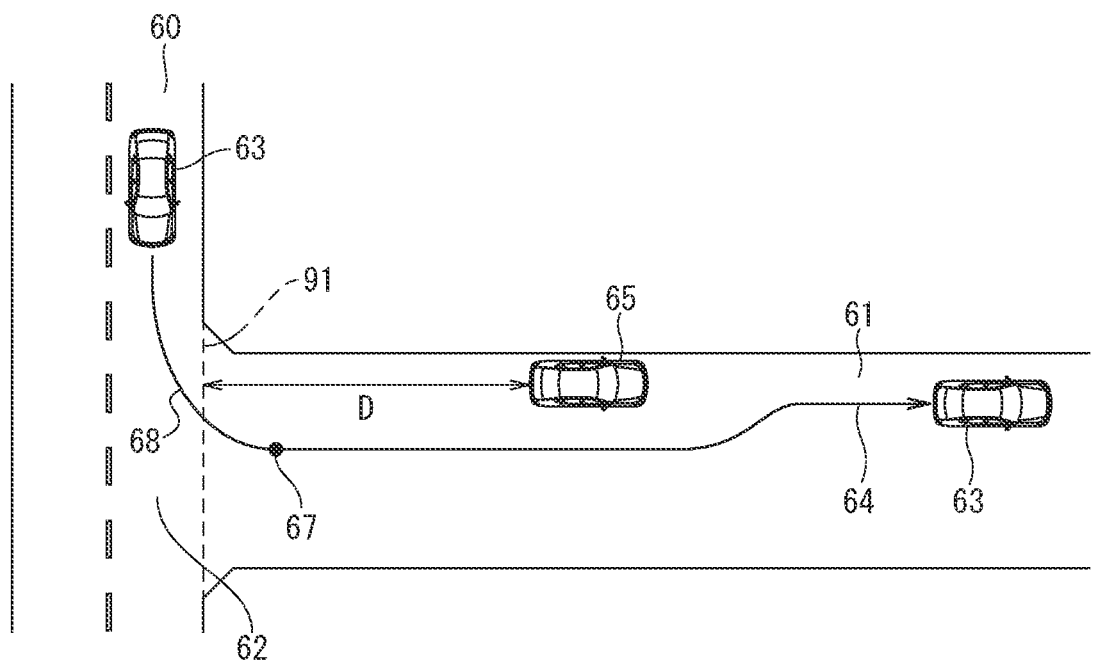
FIG. 7A is a diagram descriptive of an example of a case where steering control for turning and steering control for, after turning, avoidance of a parked vehicle are integrated.

FIG. 7A is now referred to. When the parked vehicle 65 is present on a road that the own vehicle 63, after having turned, enters, the integration determination unit 87 determines to integrate steering control when, for example, the distance D between the turning position and the avoidance position is equal to or less than a predetermined distance Dt and no oncoming vehicle that is traveling on the intersecting road 61 and approaching the own vehicle 63 exists.

The integration determination unit 87 may determine whether or not an oncoming vehicle exists, based on the other vehicle information output from the other vehicle information acquisition unit 83.

The predetermined distance Dt may be set based on a standard avoidance time T that is a standard time required for the own vehicle 63 to avoid and pass beside a parked vehicle.

The standard avoidance time T may be, for example, a period of time from a time point at which the own vehicle 63 starts a lateral movement from the regular travel line 64 in order to pass beside the parked vehicle 65 with a lateral interval interposed between the parked vehicle 65 and the own vehicle 63 to a time point at which the own vehicle 63 has passed beside the parked vehicle 65 and returns to the regular travel line 64 as indicated by the travel line 66 illustrated in FIG. 2B.

The integration determination unit 87 may, for example, set a product V×T of the standard avoidance time T and velocity V of the own vehicle 63 as the predetermined distance Dt.

Figure 7B:
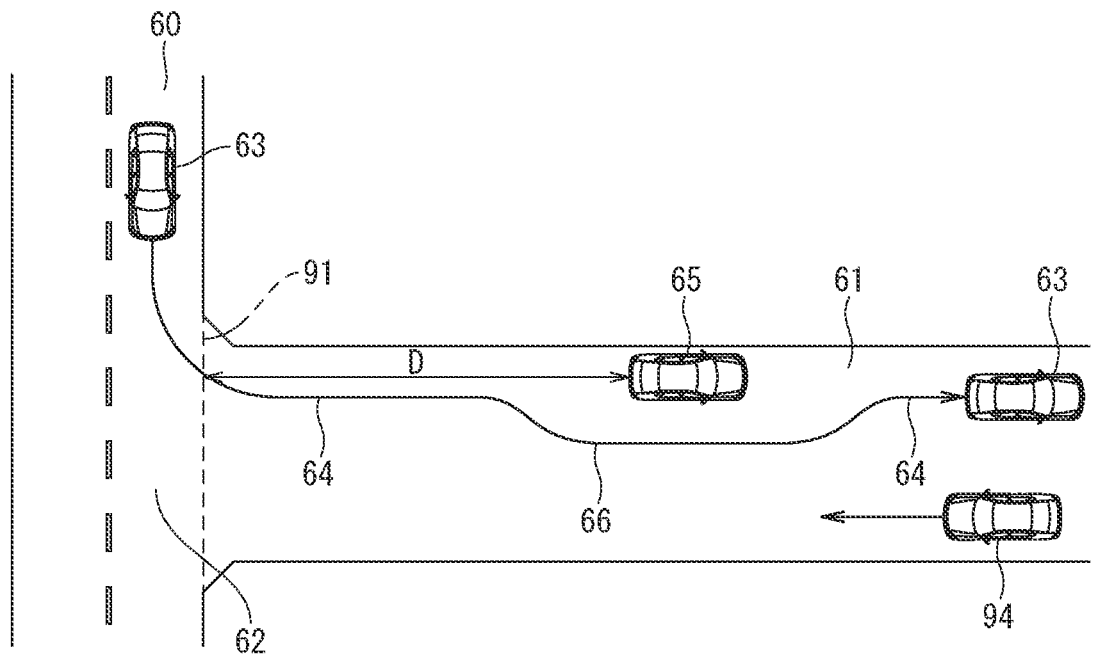
FIG. 7B is a diagram descriptive of an example of a case where the steering control for turning and the steering control for, after turning, avoidance of a parked vehicle are performed separately.

FIG. 7B is now referred to. For example, the integration determination unit 87 determines not to integrate steering control when the distance D between the turning position and the avoidance position is longer than the predetermined distance Dt. For example, the integration determination unit 87 may also determine not to integrate steering control when an oncoming vehicle 94 that is traveling on the intersecting road 61 and approaching the own vehicle 63 exists.

Figure 8A:
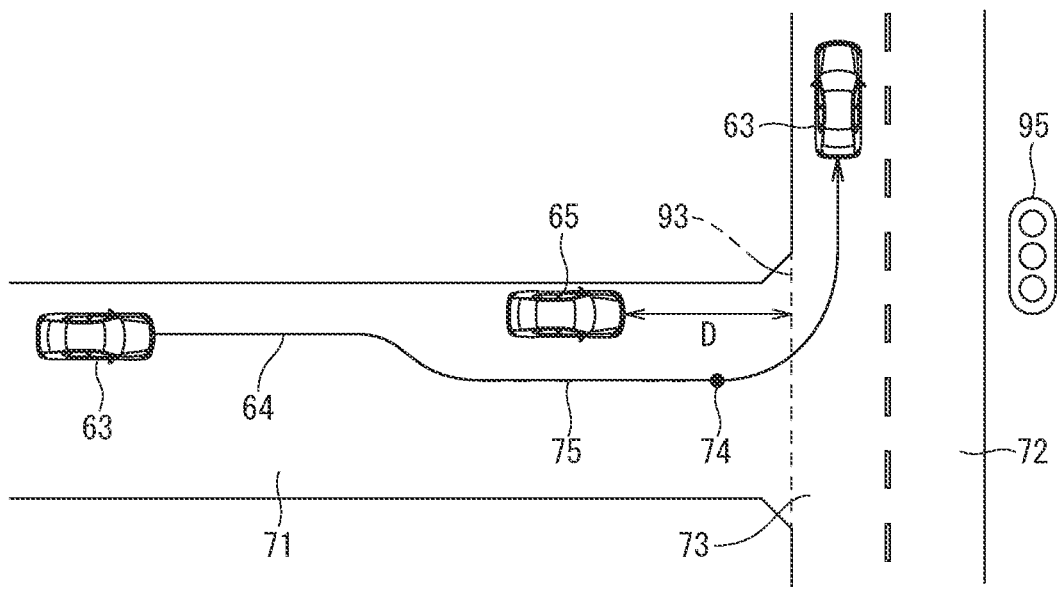
FIG. 8A is a diagram descriptive of an example of a case where steering control for avoidance of a parked vehicle and steering control for, after avoidance, turning are integrated.

FIG. 8A is now referred to. When the own vehicle 63 avoids the parked vehicle 65 and subsequently turns, the integration determination unit 87 determines to integrate steering control when, for example, distance D between the turning position and the avoidance position (that is, distance from the turning position to the parked vehicle 65) is equal to or less than a predetermined distance Dt, no oncoming vehicle that is traveling on the own vehicle road 71 and approaching the own vehicle 63 exists, and no intersecting vehicle that is traveling on the intersecting road 72 and approaching the intersection 73 exists.

There is a possibility that such an intersecting vehicle turns at the intersection 73 and enters the own vehicle road 71. Therefore, when the own vehicle 63 is close to the opposite lane in a vicinity of the intersection 73 as a result of the steering control integration, there is a possibility that the own vehicle 63 prevents the intersecting vehicle that is to enter the own vehicle road 71 from traveling. For this reason, the integration determination unit 87 determines to integrate steering control when no intersecting vehicle exists.

For example, the integration determination unit 87 may determine whether or not an intersecting vehicle exists, based on the other vehicle information output from the other vehicle information acquisition unit 83.

When a traffic signal 95 at the intersection 73 indicates a proceed signal to the own vehicle 63, the intersecting vehicle does not enter the own vehicle road 71. Therefore, when, for example, the traffic signal 95 indicates a proceed signal to the own vehicle 63, the integration determination unit 87 may determine that no such intersecting vehicle exists. The integration determination unit 87 may determine a signal indication of the traffic signal 95 at the intersection 73, based on, for example, the intersecting road information output from the intersecting road information acquisition unit 82.

Figure 8B:
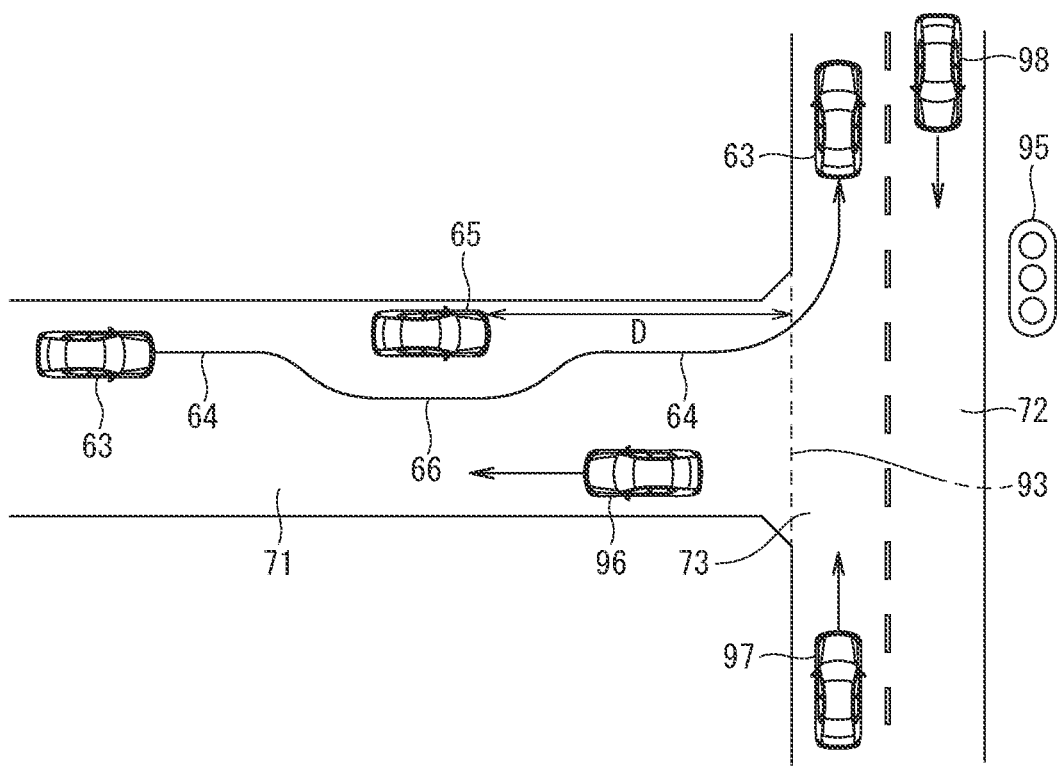
FIG. 8B is a diagram descriptive of an example of a case where the steering control for avoidance of a parked vehicle and the steering control for, after avoidance, turning are performed separately.

FIG. 8B is now referred to. For example, the integration determination unit 87 determines not to integrate steering control when the distance D between the turning position and the avoidance position is longer than the predetermined distance Dt. For example, the integration determination unit 87 may also determine not to integrate steering control when an oncoming vehicle 96 that is traveling on the own vehicle road 71 and approaching the own vehicle 63 exists. For example, the integration determination unit 87 may also determine not to integrate steering control when intersecting vehicles 97 and 98 that are traveling on the intersecting road 72 and approaching the intersection 73 exist.

When the traffic signal 95 does not indicate a proceed signal to the own vehicle 63 (for example, the traffic signal 95 indicates a stop signal), the integration determination unit 87 may determine that an intersecting vehicle exists.

Figure 9A:
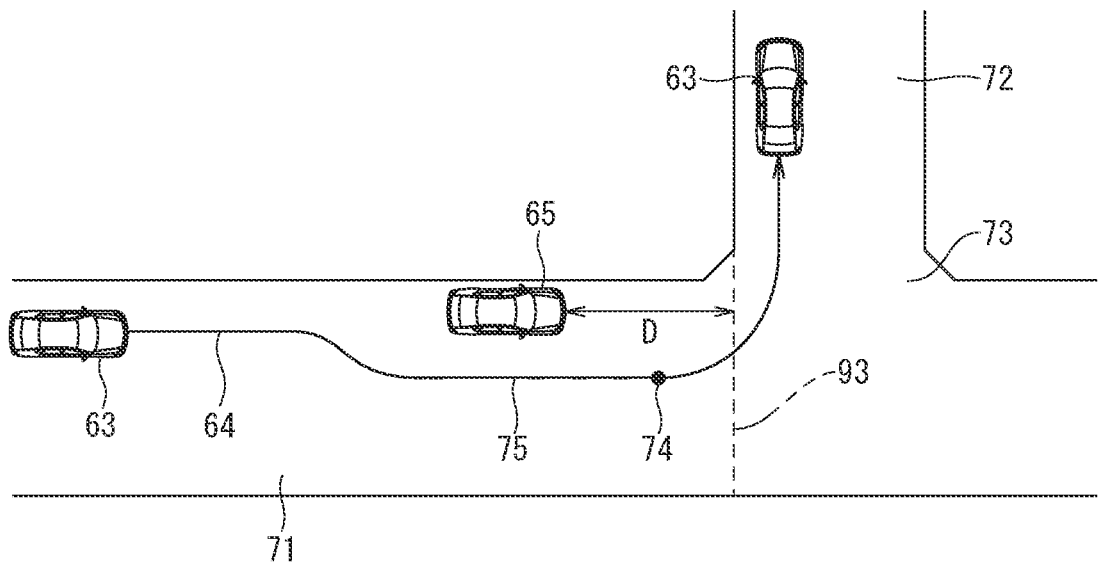
FIG. 9A is a diagram descriptive of another example of the case where the steering control for avoidance of a parked vehicle and the steering control for, after avoidance, turning are integrated.

FIG. 9A is now referred to. For example, the integration determination unit 87 may determine to integrate steering control when the distance D between the turning position and the avoidance position is equal to or less than the predetermined distance Dt, no oncoming vehicle approaching the own vehicle 63 exists, and no lane marking separating the travel lane and the opposite lane is marked on the own vehicle road 71.

The integration determination unit 87 may determine whether or not such a lane marking is marked, based on the surrounding environment information output from the surrounding environment sensor group 10 and the surrounding environment sensor group 10.

Figure 9B:
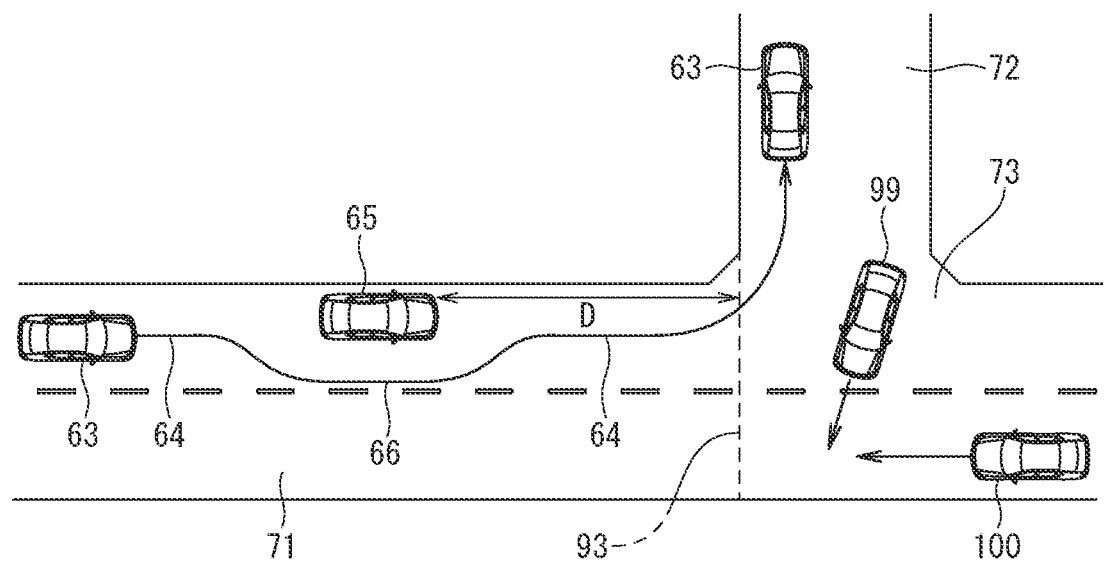
FIG. 9B is a diagram descriptive of another example of the case where the steering control for avoidance of a parked vehicle and the steering control for, after avoidance, turning are performed separately.

FIG. 9B is now referred to. For example, the integration determination unit 87 determines not to integrate steering control when the distance D between the turning position and the avoidance position is longer than the predetermined distance Dt. For example, the integration determination unit 87 may also determine not to integrate steering control when an intersecting vehicle 99 or an oncoming vehicle 100 exists.

For example, the integration determination unit 87 may also determine not to integrate steering control when a lane marking separating the travel lane and the opposite lane is marked on the own vehicle road 71.

FIG. 5 is now referred to. The integration determination unit 87 outputs a determination result of whether or not to integrate steering control to the trajectory generation unit 88.

The trajectory generation unit 88 generates a target travel trajectory on which the own vehicle is made to travel, based on the surrounding environment information output from the surrounding environment sensor group 10, the road map data provided from the navigation system 20, the travel route set by the navigation system 20, and the vehicle signal.

When the integration determination unit 87 determines to integrate steering control, the trajectory generation unit 88 generates a target travel trajectory where the steering control for turning and the steering control for avoidance of the parked vehicle 65 are integrated. Specifically, the trajectory generation unit 88 generates a target travel trajectory in such a way that the own vehicle 63 avoids and passes beside the parked vehicle 65 and, in conjunction therewith, interposes a lateral interval between the own vehicle 63 and the parked vehicle 65 at a start position or an end position of turning at the intersection.

FIG. 7A is now referred to. For example, the trajectory generation unit 88 generates a target travel trajectory 68 on which the own vehicle 63 turns to the left at the intersection 62 in such a way as to interpose a lateral interval between the own vehicle 63 and the parked vehicle 65 at the turning end position 67 on the intersecting road 61 and avoids and passes beside the parked vehicle 65.

FIGS. 8A and 9A are now referred to. For example, the trajectory generation unit 88 generates a target travel trajectory 75 on which the own vehicle 63 avoids and passes beside the parked vehicle 65 in such a way as to interpose a lateral interval between the own vehicle 63 and the parked vehicle 65 at the turning start position 74 on the own vehicle road 71 and subsequently turns to the left at the intersection 73.

Figure 10:
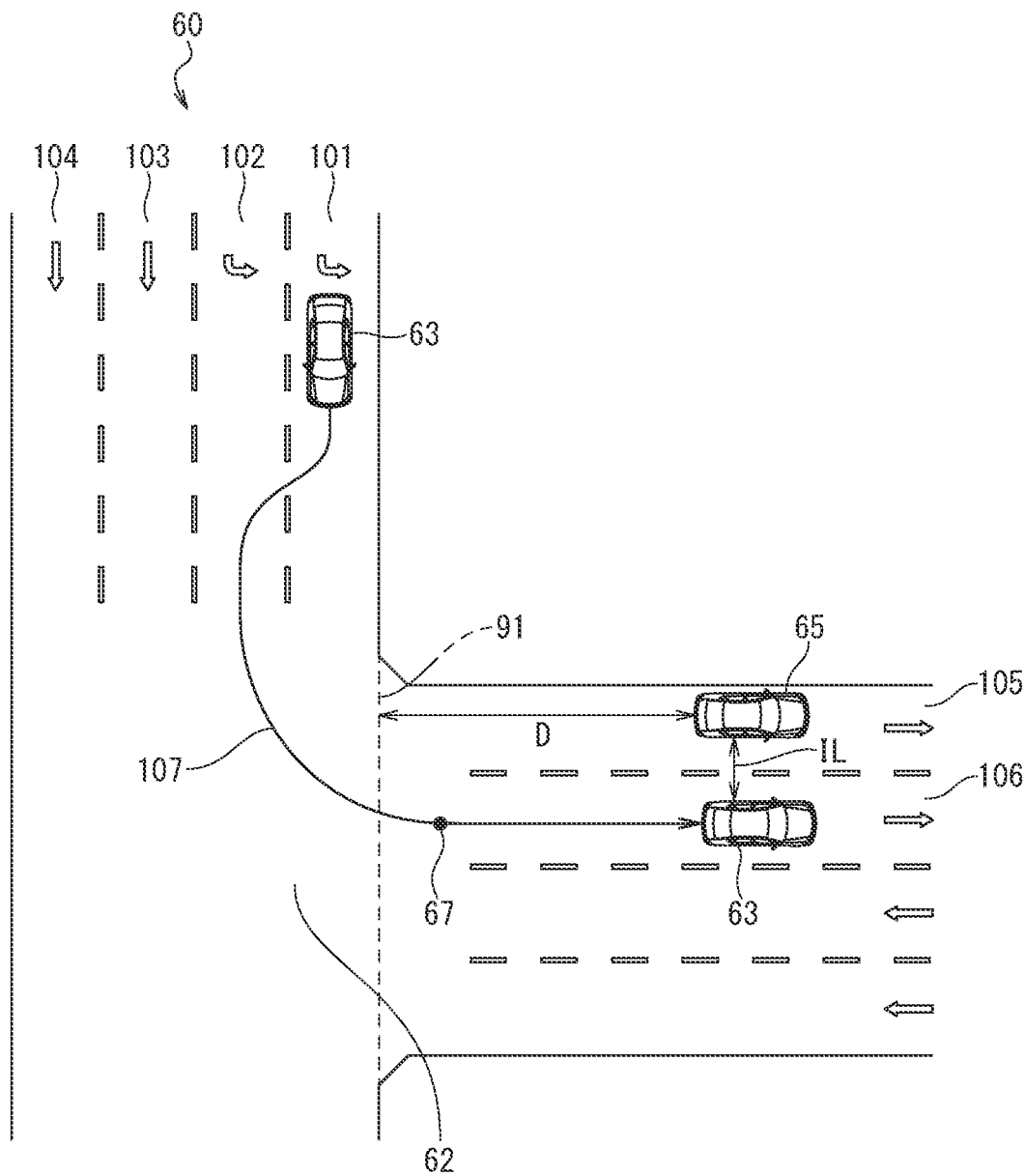
FIG. 10 is a diagram illustrative of an example of driving assistance in which steering control for making an own vehicle turn from a road having a plurality of lanes to a road on which a parked vehicle is present and steering control for, after turning, avoidance of the parked vehicle are integrated.

FIG. 10 is now referred to. The own vehicle road 60 has a plurality of lanes (for example, a plurality of lanes on one side) 101 to 104 on which vehicles can travel in the same direction as the travel direction of the own vehicle, and the intersecting road 61 has a plurality of lanes (for example, a plurality of lanes on one side) 105 and 106 on which vehicles can travel in the same direction as the travel direction of the own vehicle.

In this case, the trajectory generation unit 88 may generate a target travel trajectory 107 on which the own vehicle 63 makes a lane change from the lane 101, which is farther from the opposite lanes, to the lane 102, which is closer to the opposite lanes, of the lanes 101 and 102 from which vehicles are allowed to enter the intersecting road 61 and subsequently starts turning at the intersection 62.

The lane 102, which is closer to the opposite lanes, is a lane on the right side of the lane 101, which is farther from the opposite lanes, in an area where the left-hand traffic is mandatory and a lane on the left side of the lane 101, which is farther from the opposite lanes, in an area where the right-hand traffic is mandatory.

Making a lane change before turning at the intersection 62 in this way enables the own vehicle 63, which is traveling on the lane 101 and is to enter the lane 105 on which the parked vehicle 65 is present, to be prevented from making a lane change in the intersection 62 to enter the lane 106 on which the own vehicle 63 can avoid and pass the parked vehicle 65.

When the integration determination unit 87 determines not to integrate steering control, the trajectory generation unit 88 generates a target travel trajectory where the steering control for turning and the steering control for avoidance of the parked vehicle 65 are performed separately. That is, the trajectory generation unit 88 generates a target travel trajectory where the steering control for turning and the steering control for avoidance of the parked vehicle 65 are not continuous.

FIG. 7B is now referred to. For example, the trajectory generation unit 88 generates a target travel trajectory on which the own vehicle 63 is once made to travel along the regular travel line 64 immediately after the own vehicle 63 has turned at the intersection 62 and entered the intersecting road 61 and subsequently made to avoid and pass beside the parked vehicle 65 as indicated by the travel line 66 and return to the regular travel line 64.

FIGS. 8B and 9B are now referred to. For example, the trajectory generation unit 88 generates a target travel trajectory on which the own vehicle 63 avoids and passes beside the parked vehicle 65 as indicated by the travel line 66, once returns to the regular travel line 64, and subsequently turns at the intersection 73 and enters the intersecting road 72.

The travel control unit 89 drives the actuator group 50 in such a way that the own vehicle 63 travels on the target travel trajectory generated by the trajectory generation unit 88. As a result, the travel control unit 89 performs steering control, based on the target travel trajectory.

(Operation)

Next, with reference to FIGS. 11A, 11B, 12A, and 12B, an example of operation of the driving assistance device 1 will be described.

Figure 11A:
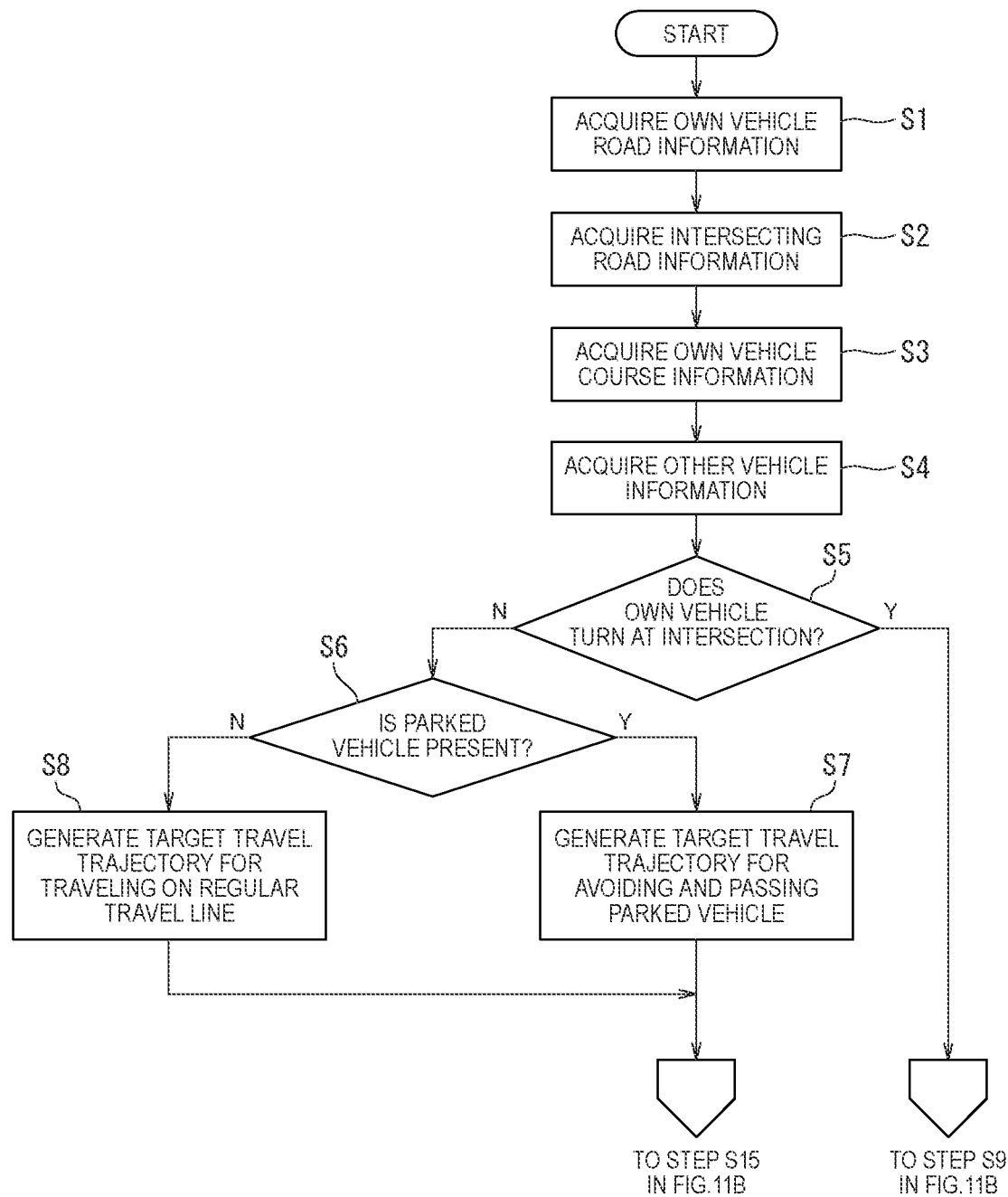
FIG. 11A is a flowchart (part 1) of a first example of a driving assistance method of the embodiment.
Figure 11B:
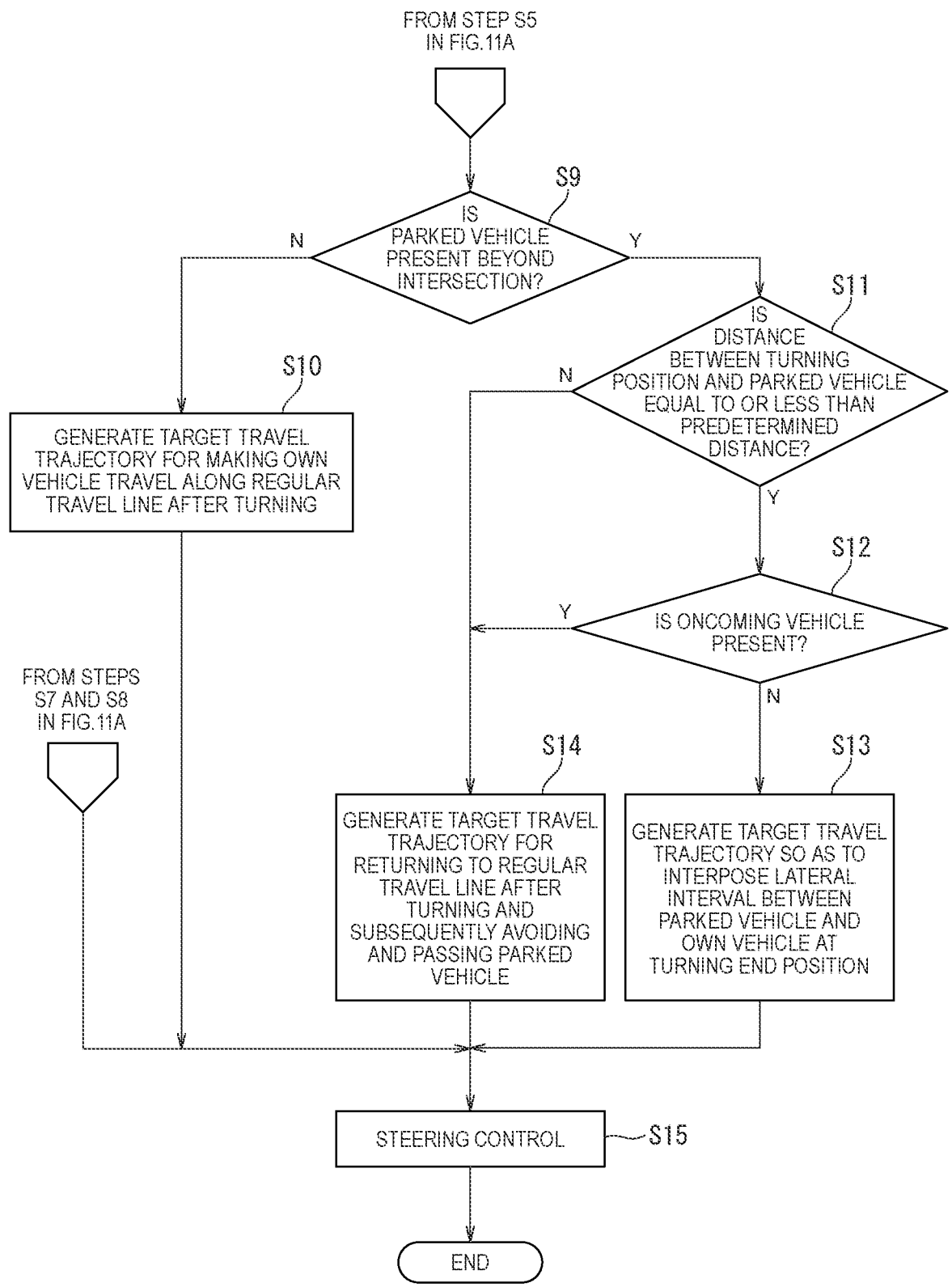
FIG. 11B is a flowchart (part 2) of the first example of the driving assistance method of the embodiment.

In an operation illustrated in FIGS. 11A and 11B, steering control is integrated when a parked vehicle 65 is present on a road that an own vehicle 63, after having turned, enters.

In step S1, the own vehicle road information acquisition unit 80 acquires own vehicle road information. The own vehicle road information may be, for example, information representing road width WO of an own vehicle road.

In step S2, the intersecting road information acquisition unit 82 acquires intersecting road information. The intersecting road information may be information that represents, for example, a position (Xin, Yin) and road width of an intersecting road and signal indication of the traffic signal 95 installed at the intersection of the own vehicle road and the intersecting road.

In step S3, the own vehicle course information acquisition unit 81 acquires own vehicle course information. The own vehicle course information may be information representing, for example, whether the own vehicle travels straight, turns to the left, or turns to the right at the intersection of the own vehicle road and the intersecting road.

In step S4, the other vehicle information acquisition unit 83 acquires other vehicle information. The other vehicle information may be information on, for example, a parked vehicle 65, an oncoming vehicle approaching the own vehicle 63 on the own vehicle road or the intersecting road, and an intersecting vehicle traveling on the intersecting road and approaching the intersection of the own vehicle road and the intersecting road.

In step S5, the integration determination unit 87 determines whether or not the own vehicle 63 turns at the intersection. When the own vehicle 63 turns at the intersection (step S5: Y), the process proceeds to step S9. When the own vehicle 63 does not turn at the intersection (step S5: N), the process proceeds to step S6.

In step S6, the trajectory generation unit 88 determines whether or not the parked vehicle 65 is present ahead on a route along which the own vehicle 63 is to travel. When the parked vehicle 65 is present (step S6: Y), the process proceeds to step S7. When the parked vehicle 65 is not present (step S6: N), the process proceeds to step S8.

In step S7, the trajectory generation unit 88 generates a target travel trajectory on which the own vehicle 63 avoids and passes beside the parked vehicle 65. Subsequently, the process proceeds to step S15.

In step S8, the trajectory generation unit 88 generates a target travel trajectory on which the own vehicle 63 is made to travel along a regular travel line 64. Subsequently, the process proceeds to step S15.

In step S9, the integration determination unit 87 determines whether or not the parked vehicle 65 is present beyond the intersection at which the own vehicle 63 is to turn. That is, the integration determination unit 87 determines whether or not the parked vehicle 65 is present on a road that the own vehicle 63, after having turned at the intersection, enters. When the parked vehicle 65 is present (step S9: Y), the process proceeds to step S11. When the parked vehicle 65 is not present (step S9: N), the process proceeds to step S10.

In step S10, the trajectory generation unit 88 generates a target travel trajectory on which the own vehicle is made to travel along the regular travel line 64 on the road that the own vehicle, after having turned at the intersection, enters. Subsequently, the process proceeds to step S15.

In step S11, the integration determination unit 87 determines whether or not distance D between the turning position and the parked vehicle is equal to or less than a predetermined distance Dt. When the distance D is equal to or less than the predetermined distance Dt (step S11: Y), the process proceeds to step S12. When the distance D is longer than the predetermined distance Dt (step S11: N), the process proceeds to step S14.

In step S12, the integration determination unit 87 determines whether or not an oncoming vehicle that is traveling on the road on which the parked vehicle 65 is present and approaching the own vehicle 63 exists. When such an oncoming vehicle exists (step S12: Y), the process proceeds to step S14. When no such oncoming vehicle exists (step S12: N), the process proceeds to step S13.

In step S13, the integration determination unit 87 determines to integrate steering control. The trajectory generation unit 88 generates a target travel trajectory 68 on which the own vehicle 63 turns at the intersection in such a way as to interpose a lateral interval between the own vehicle 63 and the parked vehicle 65 at an end position of turning at the intersection and avoids and passes beside the parked vehicle. Subsequently, the process proceeds to step S15.

In step S14, the integration determination unit 87 determines not to integrate steering control. The trajectory generation unit 88 generates a target travel trajectory where steering control for turning and steering control for avoidance of the parked vehicle 65 are performed separately.

Specifically, the integration determination unit 87 generates a target travel trajectory on which the own vehicle 63 is once made to travel along the regular travel line 64 after having turned at the intersection and subsequently made to avoid and pass beside the parked vehicle 65 as indicated by the travel line 66 and return to the regular travel line 64. Subsequently, the process proceeds to step S15.

In step S15, the travel control unit 89 performs steering control, based on the target travel trajectory. Subsequently, the process is terminated.

In an operation illustrated in FIGS. 12A and 12B, steering control is integrated when the own vehicle 63 avoids the parked vehicle 65 and subsequently turns.

Processing in steps S21 to S28 are the same as the processing in steps S1 to S8 in FIG. 11A. In step S25, when the own vehicle 63 turns at an intersection 73 (step S25: Y), the process proceeds to step S29. After processing in step S27 or S28, the process proceeds to step S36.

In step S29, the integration determination unit 87 determines whether or not a parked vehicle 65 is present before an intersection at which the own vehicle 63 is to turn. That is, the integration determination unit 87 determines whether or not the own vehicle 63, after having avoided the parked vehicle 65, turns. When the parked vehicle 65 is present (step S29: Y), the process proceeds to step S31. When the parked vehicle 65 is not present (step S29: N), the process proceeds to step S30.

In step S30, the trajectory generation unit 88 generates a target travel trajectory on which the own vehicle 63 starts turning at the intersection from a regular travel line. Subsequently, the process proceeds to step S36.

In step S31, the integration determination unit 87 determines whether or not distance D between the turning position and the parked vehicle is equal to or less than a predetermined distance Dt. When the distance D is equal to or less than the predetermined distance Dt (step S31: Y), the process proceeds to step S32. When the distance D is longer than the predetermined distance Dt (step S31: N), the process proceeds to step S35.

In step S32, the integration determination unit 87 determines whether or not an oncoming vehicle that is traveling on the road on which the parked vehicle 65 is present and approaching the own vehicle 63 exists. When such an oncoming vehicle exists (step S32: Y), the process proceeds to step S35. When no such oncoming vehicle exists (step S32: N), the process proceeds to step S33.

In step S33, the integration determination unit 87 determines whether or not an intersecting vehicle that is traveling on a road intersecting the road on which the parked vehicle 65 is present and approaching the intersection exists. When such an intersecting vehicle exists (step S33: Y), the process proceeds to step S35. When no such intersecting vehicle exists (step S33: N), the process proceeds to step S34.

In step S34, the integration determination unit 87 determines to integrate steering control. The trajectory generation unit 88 generates a target travel trajectory on which the own vehicle 63 avoids and passes beside the parked vehicle 65 in such a way as to interpose a lateral interval between the own vehicle 63 and the parked vehicle 65 at a start position of turning at the intersection and subsequently turns at the intersection. Subsequently, the process proceeds to step S36.

In step S35, the integration determination unit 87 determines not to integrate steering control. The trajectory generation unit 88 generates a target travel trajectory where steering control for turning and steering control for avoidance of the parked vehicle 65 are performed separately.

Specifically, the trajectory generation unit 88 generates a target travel trajectory on which the own vehicle 63 avoids and passes beside the parked vehicle 65 as indicated by the travel line 66, once returns to the regular travel line 64, and subsequently turns at the intersection. Subsequently, the process proceeds to step S36.

In step S36, the travel control unit 89 performs steering control, based on the target travel trajectory. Subsequently, the process is terminated.

Advantageous Effects of Embodiment (1) The controller 40 performs processing of determining presence or absence of the parked vehicle 65 ahead on a route of the own vehicle 63, processing of determining whether or not turning of the own vehicle 63 is to be performed, processing of determining whether or not the distance D between a turning position at which the turning is performed and the parked vehicle 65 satisfies a predetermined condition, trajectory generation processing of generating a target travel trajectory in such a way that, when the distance D between the turning position and the parked vehicle satisfies the predetermined condition, the own vehicle 63 passes beside the parked vehicle 65 at a predetermined side position with the predetermined interval IL interposed between the parked vehicle 65 and the own vehicle 63 on one side of the parked vehicle 65 and, in conjunction therewith, a position in the road width direction that is either a turning end position in the case of turning at a position before the position of the parked vehicle 65 or a turning start position in the case of turning after having passed beside the parked vehicle 65 on the route coincides with the predetermined side position, and processing of performing steering control, based on the target travel trajectory.

Integrating steering control in this way enables the number of times of steering to be reduced and avoidance of the parked vehicle 65 to be performed smoothly.

The present invention also has a technical advantageous effect in that the number of times of steering being reduced enables a steering mechanism to be prevented from wearing and contributes to extension of life of the steering mechanism that is autonomously controlled by the self-driving control or the driving assistance control and improves autonomous steering technology.

(2) The controller 40 performs the above-described trajectory generation processing when the own vehicle 63 turns after having passed beside the parked vehicle 65 on the route and distance from the turning position to the own vehicle 63 is farther than distance from the turning position to the parked vehicle 65.

Since this control enables steering control for avoidance of the parked vehicle 65 and steering control for subsequent turning to be performed continuously, the number of times of steering is reduced and it is possible to avoid the parked vehicle 65 smoothly.

(3) The controller 40 performs the above-described trajectory generation processing when no intersecting vehicle that is traveling on a road intersecting a road on which the parked vehicle 65 is present at an intersection at which the turning is performed and approaching the intersection is detected.

There is a possibility that such an intersecting vehicle turns at the intersection and enters the road on which the parked vehicle 65 is present. For this reason, when the own vehicle 63 starts turning with the lateral interval IL interposed between the own vehicle 63 and the parked vehicle 65 (that is, while the own vehicle 63 comes close to the opposite lane), there is a possibility that the own vehicle 63 prevents the intersecting vehicle from traveling.

Integrating steering control when no intersecting vehicle is detected enables the prevention of the intersecting vehicle from traveling to be avoided.

(4) The controller 40 performs the above-described trajectory generation processing when a traffic signal at an intersection at which the turning is performed indicates a proceed signal to the own vehicle 63.

This control enables the own vehicle 63 to be prevented from stopping at the intersection with the lateral interval IL interposed between the own vehicle 63 and the parked vehicle 65 (that is, while the own vehicle 63 comes close to the opposite lane).

(5) The controller 40 performs the above-described trajectory generation processing when the own vehicle 63 turns at a position before the position of the parked vehicle 65 on the route and distance from the turning position to the own vehicle 63 is closer than distance from the turning position to the parked vehicle 65.

Since this control causes the steering control for turning and the steering control for subsequent avoidance of the parked vehicle 65 to be performed continuously, the number of times of steering is reduced and it is possible to avoid the parked vehicle 65 smoothly.

(6) When the turning is performed at an intersection at which roads each of which has a plurality of lanes intersect each other, the controller 40 generates a travel trajectory on which the own vehicle 63 makes a lane change from a lane farther from the opposite lane to a lane closer to the opposite lane and subsequently performs the turning as the target travel trajectory.

This control enables lane change during turning at the intersection due to the integration of steering control to be prevented from being performed.

(7) The controller 40 determines distance between an entrance of an intersection of a road on which the parked vehicle 65 is present and a road intersecting the road and the parked vehicle or distance between an entrance or exit of a facility existing along a road on which the parked vehicle 65 is present and the parked vehicle as the distance D between the turning position and the parked vehicle 65.

This control enables whether or not steering control is integrated to be determined based on the distance D between the turning position and the parked vehicle 65.

(8) The predetermined condition requires the distance D between the turning position and the parked vehicle 65 to be equal to or less than a predetermined distance Dt.

Since this setting enables steering control to be integrated when the turning position and the parked vehicle 65 are close to each other, it is possible to prevent the steering control for turning and the steering control for avoidance of the parked vehicle 65 from occurring separately during a short period of time and thereby achieve smooth steering control.

(9) The predetermined distance Dt is set based on a standard time T required for the own vehicle 63 to avoid and pass beside the parked vehicle 65.

Since whether or not steering control is integrated is determined based on a standard time required to avoid the parked vehicle 65 as described above, it is possible to avoid the parked vehicle 65 without discomfort.

(10) The controller 40 performs the above-described trajectory generation processing when an oncoming vehicle that is traveling on a road on which the parked vehicle 65 is present is not approaching the own vehicle.

This control enables the own vehicle 63 to be prevented from traveling while being close to the opposite lane with a lateral interval IL interposed between the own vehicle 63 and the parked vehicle 65 when an oncoming vehicle is approaching.

(11) The controller 40 performs the above-described trajectory generation processing when no lane marking separating the travel lane and the opposite lane exists on a road on which the parked vehicle is present.

Since this control enables steering of a driver in which steering control is not integrated when a lane marking exists to be achieved, it is possible to avoid the parked vehicle 65 without discomfort.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

1 Driving assistance device
10 Surrounding environment sensor group
11 Ranging device
12 Camera
20 Navigation system
21 Navigation controller
22 Positioning device
23 Map database
24 Display unit
25 Operation unit
26 Voice output unit
27 Communication unit
30 Vehicle sensor group
31 Vehicle velocity sensor
32 Acceleration sensor
33 Gyro sensor
34 Steering angle sensor
35 Accelerator sensor
36 Brake sensor
40 Controller
41 Processor
42 Storage device
50 Actuator group
52 Steering actuator
53 Accelerator opening actuator
54 Brake control actuator
80 Own vehicle road information acquisition unit
81 Own vehicle course information acquisition unit
82 Intersecting road information acquisition unit
83 Other vehicle information acquisition unit
84 Vehicle signal acquisition unit
85 Turning position determination unit
86 Avoidance position determination unit
87 Integration determination unit
88 Trajectory generation unit
89 Travel control unit

The invention claimed is:

1. A driving assistance method comprising causing a controller to perform:
  processing of determining presence or absence of a parked vehicle ahead on a route of an own vehicle;
  processing of determining whether or not turning of the own vehicle is to be performed;
  processing of determining whether or not distance between a turning position at which the turning is performed and the parked vehicle satisfies a predetermined condition;
  trajectory generation processing of generating a target travel trajectory in such a way that, when the distance between the turning position and the parked vehicle satisfies the predetermined condition and the own vehicle turns after having passed beside the parked vehicle on the route, the own vehicle passes beside the parked vehicle at a predetermined side position with a predetermined interval interposed between the parked vehicle and the own vehicle on one side of the parked vehicle and a turning start position coincides with the predetermined side position in a width direction of a road on which the parked vehicle is parked; and
  processing of performing travel control, based on the target travel trajectory.

2. The driving assistance method according to claim 1, wherein
  the trajectory generation processing is performed when a distance from the turning position to the own vehicle is farther than a distance from the turning position to the parked vehicle.

3. The driving assistance method according to claim 2, wherein
  the trajectory generation processing is performed when no other vehicle traveling on a road intersecting a road on which the parked vehicle is present at an intersection at which the turning is performed and approaching the intersection is detected.

4. The driving assistance method according to claim 2, wherein
  the trajectory generation processing is performed when a traffic signal at an intersection at which the turning is performed indicates a proceed signal to the own vehicle.

5. The driving assistance method according to claim 1, wherein
  distance between an entrance of an intersection of a road on which the parked vehicle is present and a road intersecting the road and the parked vehicle or distance between an entrance or exit of a facility existing along a road on which the parked vehicle is present and the parked vehicle is determined as the distance between the turning position and the parked vehicle.

6. The driving assistance method according to claim 1, wherein
  the predetermined condition requires the distance between the turning position and the parked vehicle to be equal to or less than a predetermined distance.

7. The driving assistance method according to claim 6, wherein
  the predetermined distance is set based on a standard time required for the own vehicle to avoid and pass beside the parked vehicle.

8. The driving assistance method according to claim 1, wherein
  the trajectory generation processing is performed when an oncoming vehicle traveling on a road on which the parked vehicle is present is not approaching the own vehicle.

9. The driving assistance method according to claim 1, wherein
  the trajectory generation processing is performed when no lane marking separating a travel lane and an opposite lane exists on a road on which the parked vehicle is present.

10. A driving assistance device comprising a controller configured to:
- detect presence or absence of a parked vehicle ahead on a route of an own vehicle;
- determine whether or not turning of the own vehicle is to be performed;
- determine whether or not distance between a turning position at which the turning is performed and the parked vehicle satisfies a predetermined condition;
- perform trajectory generation processing of generating a target travel trajectory in such a way that, when the distance between the turning position and the parked vehicle satisfies the predetermined condition and the own vehicle turns after having passed beside the parked vehicle on the route, the own vehicle passes beside the parked vehicle at a predetermined side position with a predetermined interval interposed between the parked vehicle and the own vehicle on one side of the parked vehicle and a turning start position coincides with the predetermined side position in a width direction of a road on which the parked vehicle is parked; and
- perform travel control, based on the target travel trajectory.

\* \* \* \* \*